(12) United States Patent
Naito

(10) Patent No.: US 8,599,411 B2
(45) Date of Patent: Dec. 3, 2013

(54) SCANNING OPTICAL APPARATUS AND IMAGE FORMING APPARATUS USING THE SAME

(75) Inventor: Yuuta Naito, Tokyo (JP)

(73) Assignee: Canon Kabushiki Kaisha (JP)

(*) Notice: Subject to any disclaimer, the term of this patent is extended or adjusted under 35 U.S.C. 154(b) by 774 days.

(21) Appl. No.: 12/793,854

(22) Filed: Jun. 4, 2010

(65) Prior Publication Data

US 2010/0309516 A1 Dec. 9, 2010

(30) Foreign Application Priority Data

Jun. 4, 2009 (JP) ................................. 2009-134842

(51) Int. Cl.
    *G06F 15/00* (2006.01)
(52) U.S. Cl.
    USPC ........................................................ 358/1.15
(58) Field of Classification Search
    USPC ........................................................ 358/1.15
    See application file for complete search history.

(56) References Cited

U.S. PATENT DOCUMENTS

| 6,785,029 B2 | 8/2004 | Takada et al. |
| 2002/0041419 A1* | 4/2002 | Takada et al. ................. 359/204 |

FOREIGN PATENT DOCUMENTS

| JP | 10-78556 A | 3/1989 |
| JP | 2001-337285 A | 12/2001 |
| JP | 2005-315997 A | 11/2005 |

* cited by examiner

*Primary Examiner* — Saeid Ebrahimi Dehkordy
(74) *Attorney, Agent, or Firm* — Rossi, Kimms & McDowell LLP

(57) ABSTRACT

Provided are a scanning optical apparatus including an incident optical system for guiding a light beam emitted from a light source unit to a deflecting unit, an imaging optical system for imaging, on the surface to be scanned, a light beam deflectively scanned by the deflecting unit, and an optical path changing unit which is provided on an optical path between the deflecting unit and the surface to be scanned and includes at least two optical path changing elements. One of an optical path changing element having a minimum reflectance has a reflectance equal to or smaller than 70% in all areas used for image formation. An on-axis light beam deflected by the deflecting unit enters the optical path changing element having the minimum reflectance at a minimum angle of the at least two optical path changing elements.

9 Claims, 19 Drawing Sheets

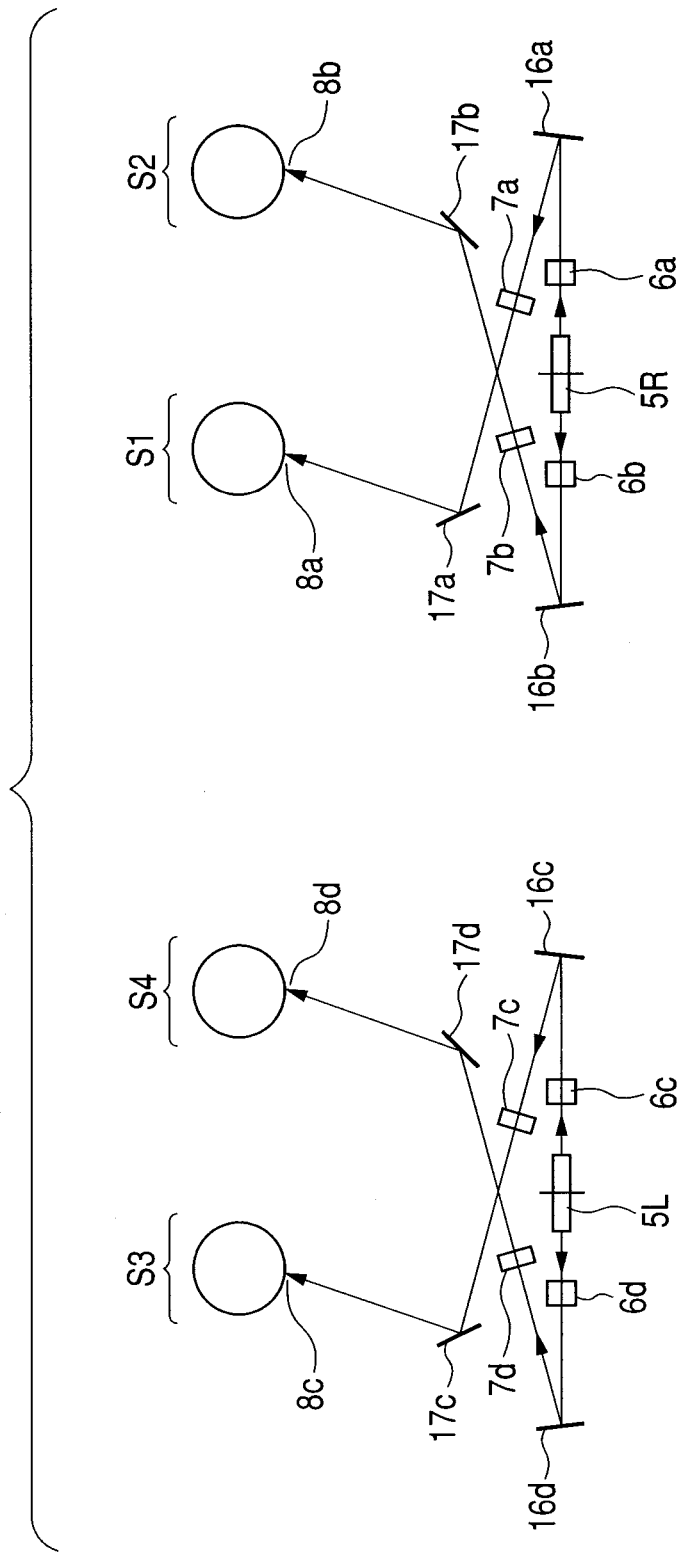

SCANNING OPTICAL APPARATUS AND IMAGE FORMING APPARATUS USING THE SAME

BACKGROUND OF THE INVENTION

1. Field of the Invention

The present invention relates to a scanning optical apparatus and an image forming apparatus using the same. The present invention is suitable for an image forming apparatus such as a laser beam printer, a digital copying machine, or a multifunction printer, which adopts an electrophotography process.

2. Description of the Related Art

Up to now, a scanning optical apparatus is used for an image forming apparatus such as a laser beam printer (LBP), a digital copying machine, or a multifunction printer. In the scanning optical apparatus, a light beam optically modulated and emitted from a light source unit according to an image signal is periodically deflected by a deflector configured by, for example, a rotary polygon mirror. The deflected light beam is focused on a photosensitive recording medium (photosensitive drum) surface in the form of a spot by means of an imaging optical system (imaging lens system) having an fθ characteristic, and the surface is optically scanned to record an image.

In order to adjust a timing for starting the formation of the image on the photosensitive drum surface before scanning the photosensitive drum surface with the light spot, a synchronization detection sensor serving as an optical detector is provided for the scanning optical apparatus described above.

In order to increase a printing speed, a light source unit for emitting multiple light beams may be used for the scanning optical apparatus. In this case, when polarized directions of the respective light beams are not aligned, a ratio between a P-polarized component and an S-polarized component (polarized component ratio) of each of the light beams which passes through or is reflected on optical elements before reaching a surface to be scanned is changed among the respective light beams. As a result, the amount of light on the surface to be scanned is changed among the respective light beams. Various scanning optical apparatus which solve such a problem have been proposed up to now (see Japanese Patent Application Laid-Open No. 2001-337285 and Japanese Patent Application Laid-Open No. 2005-315997).

In Japanese Patent Application Laid-Open No. 2001-337285 and Japanese Patent Application Laid-Open No. 2005-315997, a P-polarized reflectance and an S-polarized reflectance for each of the optical elements which the light beams pass through or are reflected on are made equal to each other. Therefore, even when the polarized component ratio is changed relative to a design value, the unevenness of the amount of light on the surface to be scanned is suppressed.

In order to increase a processing speed, a high-sensitivity photosensitive drum may be used for an image pickup apparatus using the scanning optical apparatus. In this case, when the power of laser light emitted from a laser diode (LD) is reduced corresponding to the high-sensitivity photosensitive drum, there is a fear that light emitted from the laser diode is used in an unstable driving current region. Various scanning optical apparatus which solve such a problem have been proposed up to now (see Japanese Patent Application Laid-Open No. H10-78556).

In Japanese Patent Application Laid-Open No. H10-78556, a light amount reduction unit is provided on an optical path between the light source unit and the surface to be scanned. Therefore, while the laser diode is used in a stable driving current region, the amount of light on the surface to be scanned is reduced to use the high-sensitivity photosensitive drum.

In the scanning optical apparatus described in Japanese Patent Application Laid-Open No. 2005-315997, the following method is employed in order to suppress the unevenness of the amount of light on the surface to be scanned. In other words, the design is made such that an illuminance distribution on the surface to be scanned is uniform at an arbitrary image height in view of both a Fresnel reflection component of a transmission member located between a deflecting unit and the surface to be scanned and a reflecting film characteristic of a reflection member located between the deflecting unit and the surface to be scanned.

A scanning optical apparatus has been known in which a light beam entering a deflecting surface of the deflecting unit is caused to be obliquely entered thereon in a sub scanning direction (oblique incidence system) to make compact. In the scanning optical apparatus using the oblique incidence system, a light beam deflectively reflected on the deflecting surface of the deflecting unit travels at an angle in the sub scanning direction. As a result, in a case of an imaging lens located between the deflecting unit and the surface to be scanned, the light beam passes through a region except for a central portion in a height direction, of an effective portion of the imaging lens.

The light beam passing through the region except for the central portion in the height direction, of the effective portion of the imaging lens as described above is affected by birefringence caused by a residual stress of the imaging lens, and hence a polarized direction of the light beam changes as compared with a light beam passing through the region of the central portion. As a result, the ratio between the P-polarized component and the S-polarized component changes when the light beam passes through or is reflected on optical elements located after the imaging lens, resulting that the illuminance distribution on the surface to be scanned changes as compared with a case where the birefringence of the imaging lens is not taken into account.

Therefore, it is necessary to make the design such that the illuminance distribution on the surface to be scanned is uniform in view of the influence of birefringence of the transmission member in the polarized direction in addition to both the Fresnel reflection component of the transmission member and the reflecting film characteristic of the reflection member, which are located between the deflecting unit and the surface to be scanned.

SUMMARY OF THE INVENTION

An object of the present invention is to provide a scanning optical apparatus capable of reducing unevenness of an illuminance distribution (light amount distribution) on a surface to be scanned to form a high-quality image even in a case where a polarized direction of a light beam deflectively scanned by a deflecting unit is deviated, and an image forming apparatus using the scanning optical apparatus.

A scanning optical apparatus according to an aspect of the present invention includes a light source unit, a deflecting unit having a deflecting surface, an incident optical system for guiding a light beam emitted from the light source unit to the deflecting unit, an imaging optical system for imaging, on a surface to be scanned, a light beam deflectively scanned on the deflecting surface of the deflecting unit, and an optical path changing unit which is provided on an optical path between the deflecting unit and the surface to be scanned and includes at least two optical path changing elements, in which an optical path changing element having a minimum reflectance, of the at least two optical path changing elements has a reflectance equal to or smaller than 70% in all areas used for image formation; and when light beams including a center axis of the imaging optical system are on-axison-axis light beams, an on-axison-axis light beam entering the optical path changing element having the minimum reflectance has a minimum incident angle of the on-axison-axis light beams entering the at least two optical path changing elements.

It should be noted that in the scanning optical apparatus described above, it is preferred that the optical path changing element having the minimum reflectance have maximum change in S-polarized reflectance and P-polarized reflectance of the at least two optical path changing elements at an arbitrary incident angle corresponding to an image forming area.

Further, it is preferred that the at least two optical path changing elements have a difference between an S-polarized reflectance and a P-polarized reflectance which is equal to or smaller than 10% at an arbitrary incident angle of light beam incident angles corresponding to an image forming area.

Further, it is preferred that the light beam entering the optical path changing element on which the on-axison-axis light beam enters at the minimum incident angle have an incident angle equal to or smaller than 15° in an image forming area.

Further, it is preferred that the scanning optical apparatus include imaging optical elements located on an upstream side in a light beam traveling direction of an optical path changing element on which the on-axis light beam enters at a maximum angle, of the at least two optical path changing elements, and at least one of the imaging optical elements be shifted in a direction perpendicular to a plane formed by deflecting scanning of the light beam on the deflecting surface of the deflecting unit.

Further, it is preferred that the light source unit includes a multi-beam light source including multiple light emitting portions.

Further, a color image forming apparatus according to another aspect of the present invention includes: multiple scanning optical apparatus, each being the scanning optical apparatus described above; and multiple image bearing members provided for the surface to be scanned in each of the multiple scanning optical apparatus, for forming images having different colors.

Further, it is preferred that the color image forming apparatus further include a printer controller for converting color signals input from an external apparatus into image data of different colors and inputting the image data of different colors to the multiple scanning optical apparatus.

According to the present invention, a scanning optical apparatus capable of reducing unevenness of an illuminance distribution (light amount distribution) on a surface to be scanned to form a high-quality image even in a case where a polarized direction of a light beam deflectively scanned by a deflecting unit is deviated, and an image forming apparatus using the scanning optical apparatus may be achieved.

Further features of the present invention will become apparent from the following description of exemplary embodiments with reference to the attached drawings.

BRIEF DESCRIPTION OF THE DRAWINGS

FIG. 17 is a sub scanning sectional view illustrating Embodiment 1 of the present invention.

DESCRIPTION OF THE EMBODIMENTS

In a scanning optical apparatus according to the present invention, a light beam emitted from a light source unit is guided to a deflecting unit by an incident optical system. A light beam deflectively scanned by the deflecting unit is imaged by an imaging optical system on a surface to be scanned. In this case, an optical path changing unit including at least two optical path changing elements is provided on an optical path between the deflecting unit and the surface to be scanned. An optical path changing element having a minimum reflectance, of the at least two optical path changing elements is set such that the reflectance is equal to or smaller than 70% in all regions used for image formation. A light beam including a center axis of the imaging optical system, of the light beam deflectively scanned by the deflecting unit is assumed to be an on-axis light beam. In this case, setting is made such that the on-axis light beam enters the optical path changing element having the minimum reflectance, of the at least two optical path changing elements, at a minimum angle. Hereinafter, embodiments of the present invention are described with reference to the attached drawings.

Embodiment 1

Figure 1:
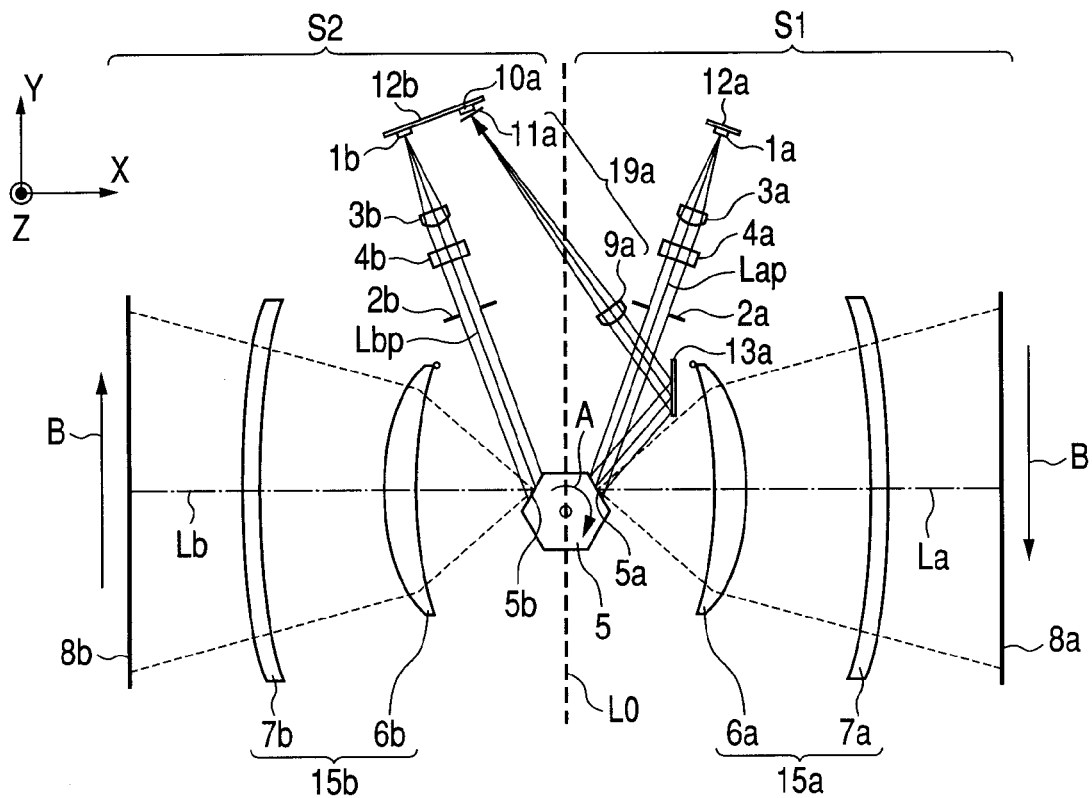
FIG. 1 is a main scanning sectional view illustrating Embodiment 1 of the present invention.
Figure 2:
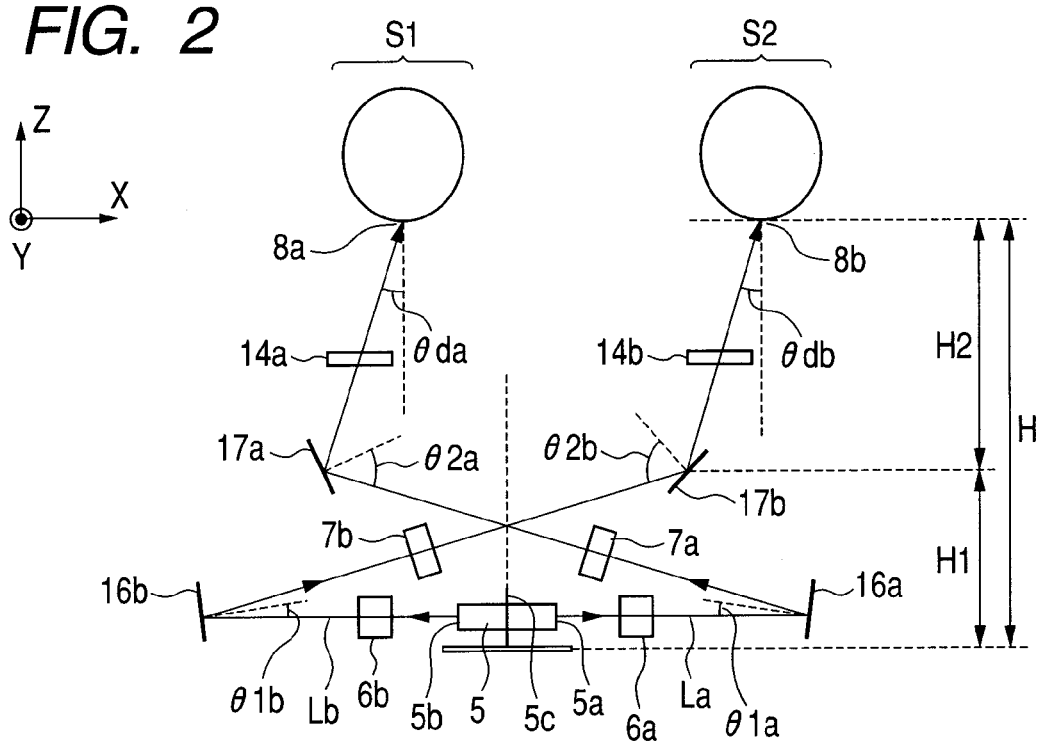
FIG. 2 is a sub scanning sectional view illustrating Embodiment 1 of the present invention.

FIG. 1 is a principal sectional view (main scanning sectional view) illustrating a scanning optical apparatus in a main scanning direction according to Embodiment 1 of the present invention. FIG. 2 is a principal sectional view (sub scanning sectional view) illustrating the scanning optical apparatus illustrated in FIG. 1 in a sub scanning direction.

In the following description, the sub scanning direction (Z-direction) is a direction parallel to a rotation-axis of the deflecting unit. The main scanning section is a section of which the normal is the sub scanning direction (direction parallel to rotational axis of deflecting unit). The main scanning direction (Y-direction) is a direction in which the light beam deflectively scanned by the deflecting unit is projected to the main scanning section. The sub scanning section is a section of which the normal is the main scanning direction.

In the drawings, first and second scanning units (hereinafter referred to also as "station") S1 and S2 are provided. In this embodiment, the first and second scanning units S1 and S2 have substantially the same structure and optical function. Hereinafter, in FIG. 1, the first scanning unit S1 is mainly described. Of respective members of the second scanning unit S2, the same members as in the first scanning unit S1 are expressed with parentheses.

The first (second) scanning unit S1 (S2) includes a light source unit (light source) 1a (1b) that emits a single (or multiple) light beam(s), and a first optical element 3a (3b) that changes a condensing state of an incident light beam and emits the light beam. Further, the first (second) scanning unit S1 (S2) includes a second optical element 4a (4b) having an optical power only in the sub scanning direction, an aperture stop 2a (2b) that limits a light beam width in the main scanning direction, and an optical deflector (deflector) 5 as the deflecting unit. Further, the first (second) scanning unit S1 (S2) includes an imaging optical system 15a (15b) that forms the light beams from the optical deflector 5 on a corresponding surface to be scanned 8a (8b) in the form of spots.

In this embodiment, the first and second scanning units S1 and S2 use the same optical deflector (deflecting unit) 5 together. Further, the first and second scanning units S1 and S2 use light beams deflectively scanned (deflectively reflected) by different deflecting surfaces 5a and 5b of the optical deflector 5, respectively. Further, the light source portion forming the light source unit 1a (1b) is configured to emit a light beam for optical scanning, and formed of a semiconductor laser, a light emitting diode, or the like. The first optical element 3a (3b) couples the light beams from the light source unit 1a (1b) together, and converts the light beam emitted from the light source unit 1a (1b) into a collimated light beam, a light beam having a low convergence property, or a light beam having a low divergence property (hereinafter referred to as collimator lens). The second optical element has a power for refracting the light beam coupled by the first optical element 3a (3b) only in the sub scanning direction for condensing the light beam on the deflecting surface 5a (5b) of the optical deflector 5 in the form of a line longer in the main scanning direction (hereinafter referred to as "cylindrical lens"). The respective elements including the collimator lens (3a and 3b) and the cylindrical lens (4a and 4b) configure one element of the incident optical system.

The optical deflector 5 is formed of, for example, a rotary polygon mirror having six facets, whose circumradius is 40 mm. The optical deflector 5 is rotated at a constant speed by a driving unit (not shown) such as a motor. In this embodiment, the first and second scanning units S1 and S2 use the optical deflector 5 together, and the first and second scanning units S1 and S2 use the light beams deflectively scanned by the different deflecting surfaces 5a and 5b of the optical deflector 5, respectively.

The imaging lens system (imaging optical system) 15a (15b) is formed of two imaging lenses (scanning lenses) 6a and 7a (6b and 7b) as imaging optical elements, and images the light beam deflectively scanned by the optical deflector 5 on the surface to be scanned 8a (8b) in the form of spots. Further, the imaging lens system 15a (15b) has a field tilt correction function for the deflecting surface 5a (5b) by provision of a conjugate relationship between the deflecting surface of the optical deflector 5 or a vicinity thereof and the surface to be scanned 8a (8b) or a vicinity thereof within the sub scanning section. The imaging lenses 6a and 7a (6b and 7b) are each formed of a plastic lens having an aspherically shaped surface high in the degree of freedom in design.

In this embodiment, the configuration of the imaging lens 6a (6b) located on the optical deflector 5 side is represented by a function of the following equations. For example, it is assumed that an optical axis La (Lb) of the imaging lens system 15a (15b) is an X-axis. Further, it is assumed that a direction orthogonal to the optical axis La (Lb) within the main scanning section on a scanning start side and a scanning end side with respect to the optical axis La (Lb) of the imaging lens 6a (6b) and the imaging optical system 15a (15b), which is located on the optical deflector 5 side, is a Y-axis. Further, it is assumed that a direction orthogonal to the optical axis La (Lb) within the sub scanning section is a Z-axis. In this situation, a surface shape of the imaging lens 6a (6b) on the scanning start side is represented by Equation 1.

$$x = \frac{y^2/R}{1+\sqrt{1-(1+K)(y/R)^2}} + B_{4s}y^4 + B_{6s}y^6 + B_{8s}y^8 + B_{10s}y^{10} \quad (1)$$

A surface shape thereof on the scanning end side is represented by Equation 2.

$$x = \frac{y^2/R}{1+\sqrt{1-(1+K)(y/R)^2}} + B_{4e}y^4 + B_{6e}y^6 + B_{8e}y^8 + B_{10e}y^{10} \quad (2)$$

where R is a radius of curvature, K, $B_4$, $B_6$, and $B_{10}$ are aspherical coefficients, suffix s of the coefficient is the scanning start side, and suffix e is the scanning end side.

Further, in the sub scanning section, the curvature is continuously changed on both surfaces of the input surface and the exit surface of the imaging lens 6a (6b) within an effective portion of the imaging lens 6a (6b). The exit surface (R4 surface) of the imaging lens 7a (7b) located on the surface to be scanned 8a (8b) side is configured so as to have the largest optical power (power: inverse number of focal length) of lens surfaces forming the imaging lens system 15a (15b). The configuration of the imaging lenses 6a and 7a (6b and 7b) within the sub scanning section is represented by the following continuous function when it is assumed that the optical axis is the X-axis, a direction orthogonal to the optical axis within the main scanning section is the Y-axis, and a direction orthogonal to the optical axis within the sub scanning section is the Z-axis, on the scanning start side and the scanning end side with respect to the optical axis La (Lb).

A surface shape thereof on the scanning start side is represented by Equation 3.

$$S = \frac{z^2/r'}{1 + \sqrt{1 - (z/r')^2}} r' = r(1 + D_{2s}y^4 + D_{4z}y^4 + D_{6s}y^6 + D_{8s}y^8 + D_{10s}y^{10}) \quad (3)$$

A surface shape thereof on the scanning end side is represented by Equation 4.

$$S = \frac{z^2/r'}{1 + \sqrt{1 - (z/r')^2}} r' = r(1 + D_{2e}y^2 + D_{4e}y^4 + D_{6e}y^6 + D_{8e}y^8 + D_{10e}y^{10}) \quad (4)$$

where r' is the radius of curvature in the sub scanning direction, and $D_2$, $D_4$, $D_6$, $D_8$, and $D_{10}$ are aspherical coefficients. The radius of curvature in the sub scanning direction is the radius of curvature in a section orthogonal to the configuration (meridian line) in the main scanning direction.

Optical parameters in this embodiment are shown in Table 1 and Table 2, in Table 2, "E-x" means $10^{-x}$.

TABLE 1

| Wavelength and refractive index | | |
|---|---|---|
| Use wavelength (nm) | λ | 790 |
| Refractive index of scanning lenses 6 and 7 | Nd | 1.531 |
| Abbe number of scanning lenses 6 and 7 | νd | 55.5 |
| Refractive index of BD lens | Nd | 1.492 |
| Abbe number of BD lens | νd | 57.9 |
| Polygon | | |
| The number of surfaces | n | 6 |
| Circumradius (mm) | φ | 40 |
| Light ray angle | | |
| Incident angle to optical deflector in main scanning direction (°) | αm | 70 |
| Incident angle to optical deflector in sub scanning direction (°) | αs | 0 |
| Maximum exit angle of optical deflector in main scanning direction (°) | θ | ±39.4 |
| Synchronization detection angle (°) | θbd | 54 |
| Arrangement | | |
| Distance between deflecting surface and first surface of scanning lens on optical deflector side (mm) | d01 | 30 |
| Thickness of scanning lens on optical deflector side (mm) | d12 | 7.5 |
| Distance between second surface of scanning lens on optical deflector side and third surface of scanning lens on surface-to-be-scanned side (mm) | d23 | 91 |
| Thickness of scanning lens on surface-to-be-scanned side (mm) | d34 | 5.5 |
| Distance between fourth surface of scanning lens on surface-to-be-scanned side and first surface of protection-against-dust glass (mm) | d45 | 66 |
| Thickness of protection-against-dust glasses (mm) | d56 | 1.8 |
| Distance between first surface of protection-against-dust glasses and surface to be scanned (mm) | d67 | 64.7 |
| Focal length of scanning lens (mm) | fp | 200 |
| Degree of convergence of collimator | r0 | 1.00E+30 |
| Distance between optical deflector and natural convergence point (mm) | | |

TABLE 2

| | Surface shape of scanning lens on optical deflector side | | | |
|---|---|---|---|---|
| | First surface | | Second surface | |
| | Scanning start side (s) | Scanning end side (e) | Scanning start side (s) | Scanning end side (e) |
| R | −6.39E+01 | −6.39E+01 | −4.17E+01 | −4.17E+01 |
| K | −4.85E+00 | −4.85E+00 | −1.30E+00 | −1.30E+00 |
| B4 | 2.88996E−07 | 2.88996E−07 | 7.71306E−08 | 7.71306E−08 |
| B6 | −2.57796E−10 | −2.57796E−10 | 1.27316E−10 | 1.27316E−10 |
| B8 | −5.11634E−14 | −5.11634E−14 | −3.66856E−13 | −3.66856E−13 |
| B10 | 9.71935E−17 | 9.71935E−17 | 1.58269E−16 | 1.58269E−16 |
| r | −1.00E+03 | −1.00E+03 | −1.00E+03 | −1.00E+03 |
| D2 | 0 | 0 | 0 | 0 |
| D4 | 0 | 0 | 0 | 0 |
| D6 | 0 | 0 | 0 | 0 |
| D8 | 0 | 0 | 0 | 0 |
| D10 | 0 | 0 | 0 | 0 |

TABLE 2-continued

| | Surface shape of scanning lens on surface-to-be-scanned side | | | |
|---|---|---|---|---|
| | Third surface | | Fourth surface | |
| | Scanning start side (s) | Scanning end side (e) | Scanning start side (s) | Scanning end side (e) |
| R | −1.16E+03 | −1.16E+03 | 1.58E+03 | 1.58E+03 |
| K | 0 | 0 | −1.38E+03 | −1.38E+03 |
| B4 | 0 | 0 | −1.65228E−07 | −1.65228E−07 |
| B6 | 0 | 0 | 1.1599E−11 | 1.1599E−11 |
| B8 | 0 | 0 | −6.81945E−16 | −6.81945E−16 |
| B10 | 0 | 0 | 1.79775E−20 | 1.79775E−20 |
| r | −1.00E+03 | −1.00E+03 | −3.33E+01 | −3.33E+01 |
| D2 | 0 | 0 | 4.77405E−05 | 0.000051174 |
| D4 | 0 | 0 | −6.41991E−09 | −7.53906E−09 |
| D6 | 0 | 0 | 6.47753E−13 | 1.02616E−12 |
| D8 | 0 | 0 | −3.27826E−17 | −9.21921E−17 |
| D10 | 0 | 0 | 5.14681E−22 | 3.81958E−21 |

A synchronization detecting unit 19a of the first scanning unit S1 (hereinafter referred to also as "synchronization detecting optical system") is provided. The synchronization detecting optical system 19a includes a synchronization detecting optical element (hereinafter referred to also as "synchronization detecting lens") 9a having an optical power at least in the main scanning direction, and a synchronization detecting element (hereinafter referred to also as "synchronization detecting sensor" or "BD sensor") 10a. Further, the synchronization detecting optical system 19a includes a slit (hereinafter referred to also as "synchronization detecting slit") 11a arranged in front of the synchronization detecting sensor 10a. Further, the synchronization detecting optical system 19a includes an optical path changing element (hereinafter referred to also as "synchronization detecting mirror") 13a that guides a light beam out of an effective image area on the surface to be scanned 8a to the synchronization detecting sensor 10a. On a circuit board 12b, the light source unit 1b and the synchronization detecting sensor 10a of the synchronization detecting optical system 19a are integrally fitted.

The synchronization detecting optical system 19a in this embodiment determines (controls) write (synchronization detecting) timing on the surface to be scanned 8a (8b) of the first (second) scanning unit S1 (S2) according to a signal from the synchronization detecting sensor 10a. In the synchronization detecting optical system 19a, the light beam for synchronization detecting (hereinafter referred to as "synchronization detecting light beam") deflectively scanned by the deflecting surface 5a is imaged on the synchronization detecting slit 11a surface. Then, the synchronization detecting light beam scans the synchronization detecting slit 11a within the main scanning section with rotation of the optical deflector 5. Further, a field tilt compensation system of the deflecting surface 5a is configured on the sub scanning section to provide a conjugate relationship between the deflecting surface 5a and the synchronization detecting slit 11a. The synchronization detecting slit 11a has an end shaped in a knife edge, and determines an image write position by taking timing of the light beam entered onto the synchronization detecting sensor 10a. The synchronization detection light beam is imaged on a surface of the synchronization detection slit 11a in the main scanning direction, but is not imaged on the surface of the synchronization detection slit 11a in the sub scanning direction. This configuration makes it difficult to generate the unevenness of sensitivity due to the manufacturing error of the synchronization detecting sensor 10a, and the unevenness of sensitivity due to deposits such as dusts. In this embodiment, one synchronization detecting sensor 10a exists for two scanning units S1 and S2, and image write timing determined by the synchronization detecting sensor is used for both of the scanning units S1 and S2.

This embodiment illustrates a case in which write timing of the two scanning units S1 and S2 is determined by one synchronization detecting optical system 19a. However, the present invention is not limited to this embodiment, and the write timing of two scanning units S1 and S2 may be determined by two synchronization detecting optical systems, respectively. That is, a configuration with the synchronization detecting optical system may be disposed for each of the scanning units S1 and S2, independently. With this configuration, the synchronization detecting timing (synchronization signal) is detected for each of the scanning units S1 and S2, independently, thereby enabling a relative error between the two scanning units S1 and S2 to be detected, and the write timing may be detected and controlled with higher precision.

Further, the two scanning units S1 and S2 are configured such that the light beams from the two light source units 1a and 1b enters the optical deflector 5 from the same direction. This embodiment illustrates a case of using two light source units 1a and 1b. However, the present invention is not limited to this configuration, and three or more light source units may be used.

Further, the principal rays Lap and Lbp of the light beam emitted from the light source units 1a and 1b enters the optical deflector 5 at an angle of 70° with respect to the optical axes La and Lb of the imaging optical systems 15a and 15b. The principal ray of the light beams means a light beam Lap (Lbp) that passes through the center of the aperture stop 2a (2b).

Then, the operation (optical action) of the scanning optical apparatus according to this embodiment is described. In this embodiment, in the first (second) scanning unit S1 (S2), the light beam optically modulated and emitted from the light source unit 1a (1b) according to image information is converted into a collimated light beam, a light beam having a low convergence property, or a light beam having a low divergence property by means of the collimator lens 3a (3b). Then, the converted light beam enters the cylindrical lens 4a (4b). The light beam within the main scanning section, which has entered the cylindrical lens 4a (4b), passes through the aperture stop 2a (2b) in an unchanged state.

On the other hand, the light beam within the sub scanning section passes through the aperture stop 2a (2b) so as to be converged, and is imaged on the deflecting surface 5a (5b) of the optical deflector 5 as a linear image (linear image longer in the main scanning direction). Then, the light beam deflectively scanned by the deflecting surface 5a (5b) of the optical deflector 5 is imaged on the photosensitive drum surface 8a (8b) in the form of spots by means of the imaging optical system 15a (15b). Then, with rotation of the optical deflector 5 in a direction indicated by an arrow A, the light beam coming from the imaging optical system 15a (15b) optically scans the photosensitive drum surface 8a (8b) at a constant speed in a direction indicated by an arrow B (main scanning direction). With the above-mentioned configuration, image recording is executed on the photosensitive drum 8a (8b) being a recording medium.

In this situation, the timing of the scanning start position on the photosensitive drum surface 8a (8b) is adjusted with the aid of the synchronization detecting optical system 19a before optically scanning the photosensitive drum surface 8a (8b). To achieve that, a part of light beam deflectively scanned by the deflecting surface 5a of the optical deflector 5 (synchronization detecting light beam) is turned back by the synchronization detecting mirror 13a, and guided to the synchronization detecting sensor 10a by means of the synchronization detecting lens 9a. As the synchronization detecting light beam, there is used a light beam of a part out of the image formation light beam (out of the image formation area) on an "upstream side" with respect to the direction B along which the spot imaged on the surface to be scanned 8a (8b) scans, that is, the image write start side.

In this embodiment, the light beam emitted from the light source unit 1a of the first scanning unit S1 is reflected by the synchronization detecting mirror 13a. Then, the light beam is guided to the synchronization detecting sensor 10a located on the laser board 12b on which the light source unit 1b on the second scanning unit S2 side positioned at an opposite side of the optical deflector 5 is arranged. The synchronization detecting sensor 10a in this embodiment is fitted integrally onto the laser board 12b together with the light source unit 1b as described above. With the above-mentioned configuration, in this embodiment, the number of parts in the circuit board is reduced, the number of wirings to a control unit is more reduced, and the apparatus may be manufactured with a smaller area, thereby downsizing the entire apparatus. As an additional effect of the integral fitting of the synchronization detecting sensor 10a to the laser board 12b, the configuration is reduced in the number of connections of the wirings, and is hardly affected by the noises. Thus, there is an advantage in that the reliability is more enhanced.

Subsequently, the configuration of the scanning optical apparatus according to this embodiment illustrated in FIG. 2 is described. FIG. 2 illustrates a sub scanning section view in which two on-axis light beams (on-axis light rays) deflectively reflected on the two deflecting surfaces 5a and 5b of the optical deflector 5 arrive at the corresponding surfaces to be scanned 8a and 8b, in the respective scanning units S1 and S2, respectively.

In the following description, each of the on-axis light beams is a light beam in a case where an angle formed between the principal ray of the light beam deflectively reflected on each of the deflecting surfaces 5a and 5b of the optical deflector 5, and each of the optical axes La and Lb of the imaging optical systems 15a and 15b is 0°. Each of the off axis light beams (off axis light rays) is a light beam other than the light beams in a case where an angle formed between the principal ray of the light beam deflectively reflected on each of the deflecting surfaces 5a and 5b of the optical deflector 5, and each of the optical axes La and Lb of the imaging optical systems 15a and 15b is 0°.

In this embodiment, in the respective scanning units S1 and S2, an optical path changing unit including two turn back reflection mirrors (reflection mirrors) 16a and 17a serving as optical path changing elements and an optical path changing unit including two turn back reflection mirrors (reflection mirrors) 16b and 17b serving as optical path changing elements are provided on the optical paths between the optical deflector 5 and the surfaces to be scanned 8a and 8b, respectively.

In the following description, in view of directions along the optical paths between the deflecting surfaces 5a and 5b of the optical deflector 5 and the surfaces to be scanned 8a and 8b in the respective scanning units S1 and S2, turn back reflection mirrors which light beams firstly reach are assumed as first turn back reflection mirrors (first optical path changing elements) 16a and 16b. In addition, turn back reflection mirrors which light beams secondly reach are assumed as second turn back reflection mirrors (second optical path changing elements) 17a and 17b. The turn back reflection mirrors (reflection mirrors) are also merely referred to as "mirrors".

In this embodiment, in the respective scanning units S1 and S2, the light beams which pass through the cylindrical lenses 4a and 4b and enter the optical deflector 5 are set in directions perpendicular to a rotational center axis 5c of the optical deflector 5 in the sub scanning section. As a result, an angle formed between the light beams immediately after the deflective reflection on the deflecting surfaces 5a and 5b and the rotational center axis 5c of the optical deflector 5 is 90°. The two turn back reflection mirrors are provided for each of the scanning units S1 and S2 to fold the optical path, to thereby reduce a size of the entire apparatus.

In this situation, the incident angle (hereinafter referred to as "on-axis incident angle") of the on-axis light beam with respect to the respective turn back reflection mirrors is 7° in the on-axis incident angle $\theta 1a$ on the first turn back reflection mirror 16a and 42° in the on-axis incident angle $\theta 2a$ on the second turn back reflection mirror 17a in the scanning unit S1.

On the other hand, the on-axis incident angle $\theta 1b$ on the first turn back reflection mirror 16b is 7° and the on-axis incident angle $\theta 2b$ on the second turn back reflection mirror 17b is 62° in the scanning unit S2.

As described above, the on-axis incident angles to the second turn back reflection mirrors 17a and 17b in the scanning units S1 and S2 are made different from each other, thereby enabling a height H (H1+H2) from a seating surface of the optical deflector 5 to the surfaces to be scanned 8a and 8b to be reduced. In other words, the on-axis incident angles $\theta 2a$ and $\theta 2b$ to the second turn back reflection mirrors 17a and 17b of the respective scanning units S1 and S2 are made different from each other to further reduce the height H.

Simultaneously with this, the directions of the light beams turned back by the second turn back reflection mirrors 17a and 17b are aligned between the respective scanning units S1 and S2. The merit that the directions of the light beams turned back by the second turn back reflection mirrors 17a and 17b are aligned between the respective scanning units S1 and S2 is as follows. For example, in a case where a color (two or more colors) image forming apparatus including the multiple scanning optical apparatus according to the present invention is to be designed, when respective image bearing members are spaced at regular intervals and incident angles to surfaces to be scanned, of the image bearing members are made equal to one another, the degree of freedom of arrangement is large.

In this embodiment, the imaging lens 6a of the two imaging lenses 6a and 7a provided on the light beam traveling direction on an upstream side of the second turn back reflection mirror 17a on which the on-axis light beam enters at a maximum angle, of the two turn back reflection mirrors 16a and 17a, is set as follows. In other words, the imaging lens 6a is shifted in a direction perpendicular to a plane formed by deflectively scanning of the light beam on the deflecting surface of the optical deflector.

To be specific, in the respective scanning units S1 and S2, the imaging lens 6a (6b) of the two imaging lenses included in the imaging optical system 15a (15b) is shifted by 1.5 mm relative to the height of the principal ray of the incident light beam (certain direction (anti-photosensitive drum side) relative to z-axis of FIG. 2). This reason is to avoid interference with the light beam reflected on the first turn back reflection mirror 16a (16b) in each of the scanning units S1 and S2. Therefore, in this embodiment, the on-axis incident angles on the first turn back reflection mirrors 16a and 16b are easily reduced in the respective scanning units S1 and S2 to further reduce the height H.

In this embodiment, the respective scanning units S1 and S2 are provided such that the respective light beams reflected on the first turn back reflection mirrors 16a and 16b travel to the rotational center axis 5c of the optical deflector 5, pass through a region (space) over the deflecting surfaces 5a and 5b, and intersect with each other. After that, the respective light beams reach the second turn back reflection mirrors 17a and 17b located over the imaging lenses 7a and 7b opposed to each other in FIG. 2.

In this embodiment, in the sub scanning section, the on-axis light beam immediately after the change of the optical path which is made by the second turn back reflection mirror 17a (17b) closer to the surface to be scanned, of the two turn back reflection mirrors is nonparallel to the rotational center axis 5c of the optical deflector 5.

In this embodiment, in the respective scanning units S1 and S2, the light beams from the light source units 1a and 1b enter the deflecting surfaces 5a and 5b with P polarization. Then, the light beams enter the first turn back reflection mirrors 16a and 16b and the second turn back reflection mirrors 17a and 17b so that the polarized direction of the light beam becomes the linear polarization of an S polarization state for only the on-axis light beam of the imaging optical systems 15a and 15b. Then, as the light beams sequentially optically scan the surfaces to be scanned 8a and 8b from the on-axis of the imaging optical systems 15a and 15b toward the off axis by means of the optical deflector 5, the polarized direction of the light beam deviates more from the S-polarized to increase a ratio of the P-polarized component.

Figure 3:
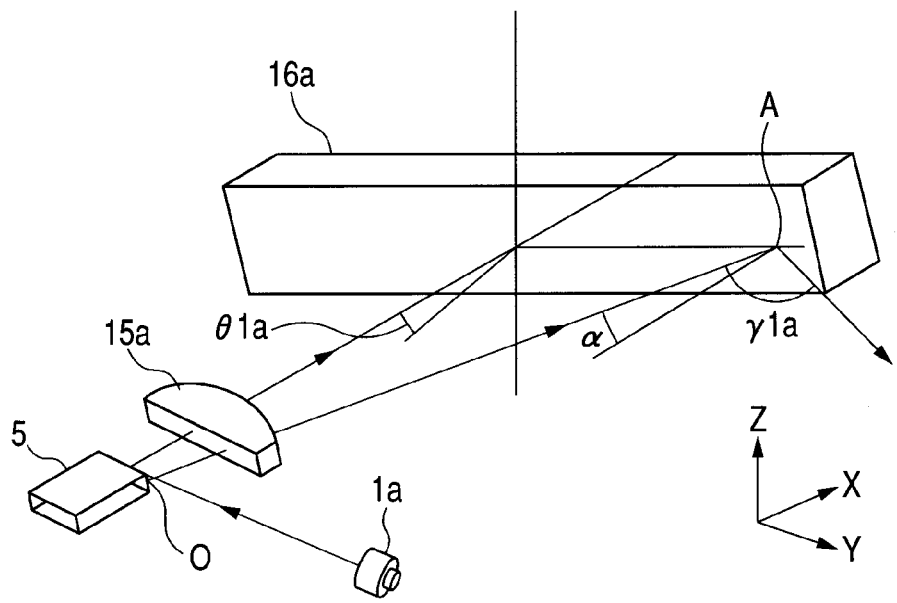
FIG. 3 is a principal schematic view illustrating a first turn back reflection mirror in Embodiment 1 of the present invention.

FIG. 3 is an explanatory diagram illustrating the incident state of the light beam to the first turn back reflection mirror 16a in the scanning unit S1 in the above-mentioned state. Because the same description may be applied to the remaining turn back reflection mirrors, only the first turn back reflection mirror 16a in the scanning unit S1 is shown in the following description. In FIG. 3, a plane including an x-axis and a y-axis is illustrated as a main scanning section. It is assumed that the scanning light beam travels from a point O toward a point A at an angle $\alpha(°)$ with the x-axis (the same direction as that of the on-axis light beam).

As illustrated in FIG. 3, an incident angle) $\gamma 1a(°)$ on the first turn back reflection mirror 16a changes depending on a scanning field angle $\alpha(°)$, and the incident angle of the on-axis light beam to the first turn back reflection mirror 16a is expressed by the following expression using $\theta 1a(°)$.

$$\gamma 1a[°] = \cos^{-1}(\cos \alpha \cdot \cos \theta 1a)[°] \quad (5)$$

Further, when the on-axis light beam enters the first turn back reflection mirror 16a with S polarization, the polarized direction of the off axis light beam has a P-polarized intensity ratio $Ep^2$ and an S-polarized intensity ratio $Es^2$ at the following ratio.

$$Ep^2 = \frac{\tan^2\alpha \cdot \left(\frac{1}{\tan\theta 1a}\right)^2}{\tan^2\alpha + 1 + \tan^2\alpha \cdot \left(\frac{1}{\tan\theta 1a}\right)^2} \quad (6)$$

$$Es^2 = 1 - Ep^2 \quad (7)$$

Through the above-mentioned expressions (6) and (7), the P-polarized component continuously increases together with the field angle from on-axis toward off axis. On the other hand, the S-polarized component continuously decreases from on-axis toward off axis. In this embodiment, with an aim to correct the light amount unevenness (image plane illuminance unevenness) on the surface to be scanned 8a, the components are set to continuously change according to the incident angle of the light beam on the turn back reflection mirror from on-axis toward off axis, and the polarized direction.

The image plane illuminance unevenness caused by the imaging optical systems 15a and 15b, and the protection-against-dust glasses 14a and 14b is corrected by continuously changing the incident angle of the deflected light beams on the turn back reflection mirrors, and the reflectance with respect to the polarized direction as described above.

Figure 4:
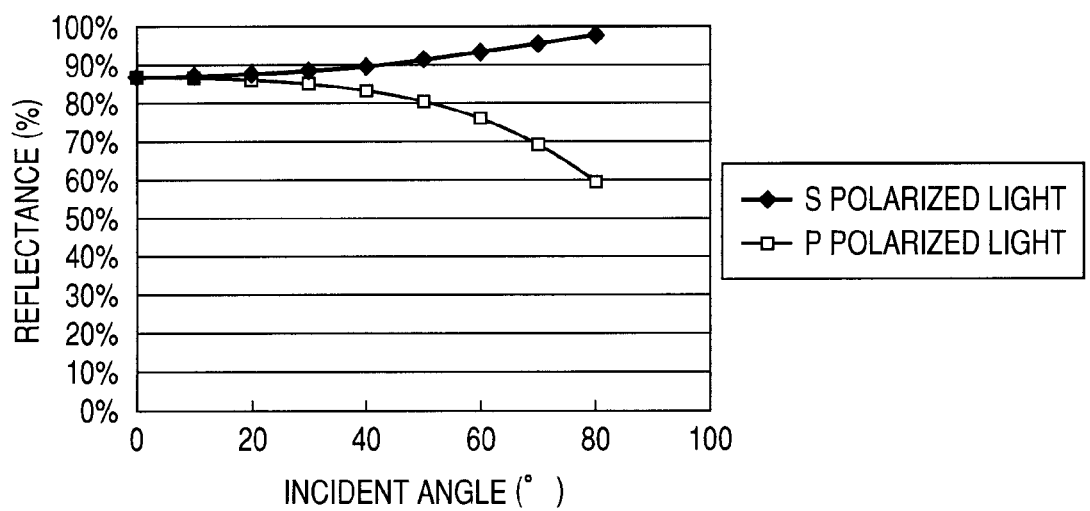
FIG. 4 is a graph illustrating normal P- and S-polarized reflectance characteristics.

Values of reflectances and reflectances of respective S- and P-polarized components are considered. FIG. 4 illustrates a reflectance characteristic of the respective S- and P-polarized components in a case where a normal turn back reflection mirror is used for oblique incidence. As is apparent from FIG. 4, in a case of vertical incidence at an incident angle of 0°, the reflectances of the respective S- and P-polarized components are equal to each other. However, a reflectance difference between the respective S- and P-polarized components significantly increases as the value of the incident angle becomes larger.

When a turn back reflection mirror in which the reflectance difference between the respective S- and P-polarized components significantly increases as described above is used as the turn back reflection mirror provided in the apparatus, there is a case where a desired reflectance characteristic is not obtained because of the influence of birefringence of the imaging lens or the influence of a variation in laser polarized direction. That is, this results from the fact that the ratio between the respective S- and P-polarized components on the turn back reflection mirror is deviated from a design value by the change of the polarized direction of the light beam entering the turn back reflection mirror. Such a problem is described below.

Figure 5:
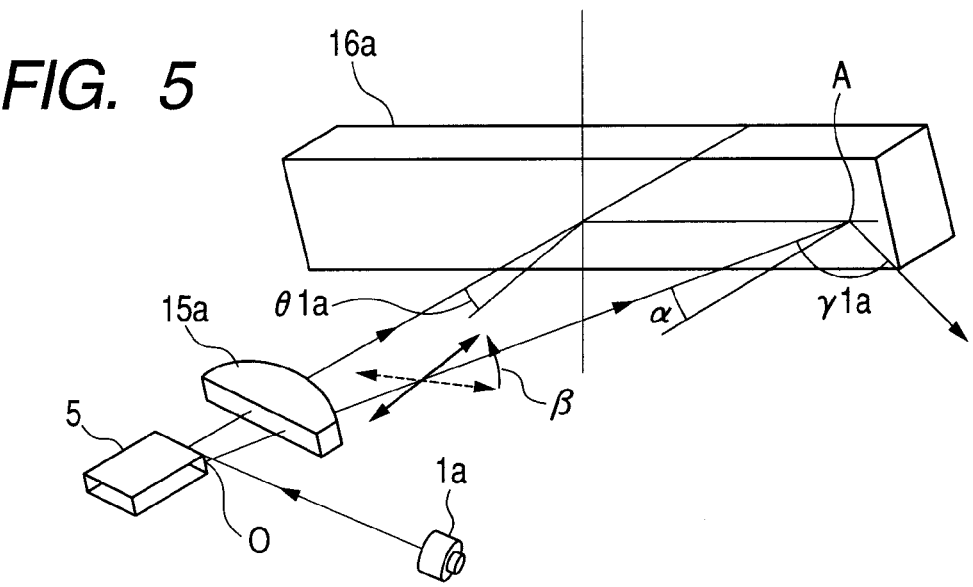
FIG. 5 is an explanatory view illustrating a deviation (rotation) in polarized direction.

FIG. 5 illustrates the incident state of the light beam to the first turn back reflection mirror 16a of the scanning unit S1 in a case where the polarized direction of the incident light beam is deviated (the same holds for remaining turn back reflection mirror). In this case, when the deviation in polarized direction of the incident light beam is expressed by $\beta(°)$ as illustrated in FIG. 5, the P-polarized intensity ratio $Ep^2$ and the S-polarized intensity ratio $Es^2$ of the off axis light beam which are obtained from Expressions (6) and (7) are changed as follows.

$$Ep^2 = \frac{\left(\sin\beta - \frac{\sin\alpha \cdot \beta}{\tan\theta 1a}\right)^2}{\cos^2\alpha \cdot \left(\tan^2\alpha + 1 + \left(\frac{\tan\alpha}{\tan\theta 1a}\right)^2\right)} \quad (8)$$

$$Es^2 = 1 - Ep^2 \quad (9)$$

A reflectance $Rg(\gamma 1a)(\%)$ of the first turn back reflection mirror 16a at an arbitrary incident angle $\gamma 1a(°)$ on the on-axis light beam and the off axis light beam which enter the first turn back reflection mirror 16a is expressed as follows. Assume that the S-polarized reflectance at the arbitrary incident angle $\gamma 1a(°)$ is expressed by $Rs(\gamma 1a)(\%)$ and the P-polarized reflectance at the arbitrary incident angle $\gamma 1a(°)$ is expressed by $Rp(\gamma 1a)(\%)$.

$$Rg(\gamma 1a)(\%)=Es^2 \cdot Rs(\gamma 1a)(\%)+Ep^2 \cdot Rp(\gamma 1a)(\%) \qquad (10)$$

As may be seen from Expression (10), in a case where the respective S- and P-polarized component reflectances $Rs(\gamma 1a)(\%)$ and $Rp(\gamma 1a)(\%)$ are different from each other, when the respective S- and P-polarized component ratios $Es^2$ and $Ep^2$ vary, the total reflectance $Rg(\gamma 1a)(\%)$ of the S- and P-polarized components also varies. That is, when the polarized direction of the incident light beam is deviated, the deviation from the designed total reflectance $Rg(\gamma 1a)(\%)$ of the S- and P-polarized components becomes larger as the reflectance difference between the S- and P-polarized component reflectances $Rs(\gamma 1a)(\%)$ and $Rp(\gamma 1a)(\%)$ increases. In contrast to this, in a case where the reflectance difference between the S- and P-polarized component reflectances $Rs(\gamma 1a)(\%)$ and $Rp(\gamma 1a)(\%)$ is small, even when the polarized direction of the incident light beam is deviated, the deviation from the designed total reflectance $Rg(\gamma 1a)(\%)$ of the S- and P-polarized components is small.

Figure 6A:
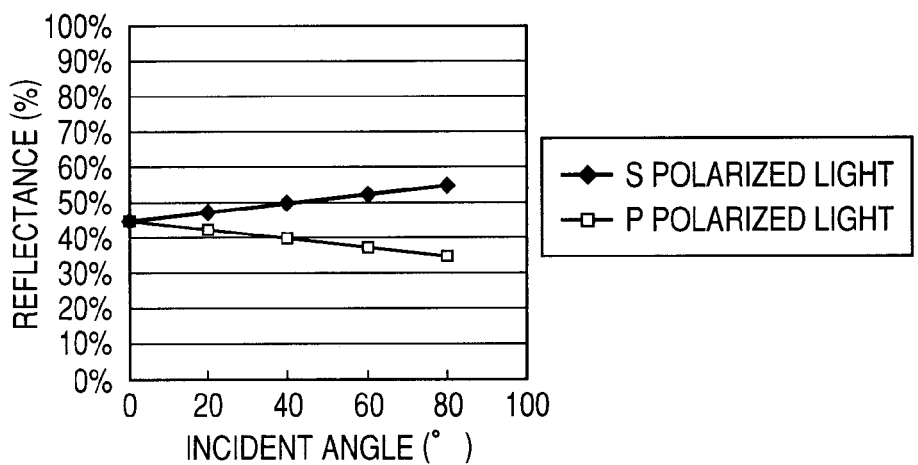
FIGS. 6A and 6B are graphs illustrating reflectance characteristics of low-reflection and high-reflection turn back reflection mirrors, respectively.
Figure 6B:
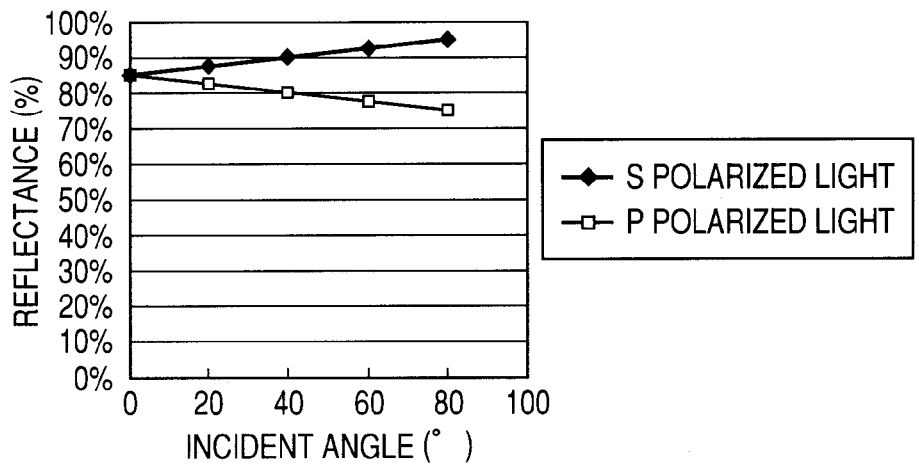

Absolute values of reflectance and a reflectance difference between respective S- and P-polarized components are described with reference to FIGS. 6A and 6B. FIGS. 6A and 6B are graphs illustrating reflectance characteristics when the reflectance difference caused between the respective S- and P-polarized components is 20% (point) at the same off axis incident angle in both cases of a low mirror reflectance (FIG. 6A) and a high mirror reflectance (FIG. 6B). In FIG. 6A illustrating the case of the low mirror reflectance, when the incident angle of the off axis light beam is 80(°), the S- and P-polarized component reflectances $Rs(80(°))(\%)$ and $Rp(80(°))(\%)$ are as follows.

$Rs(80(°))(\%)=55(\%)$
$Rp(80(°))(\%)=35(\%)$

In FIG. 6B illustrating the case of the high mirror reflectance, when the incident angle of the off axis light beam is 80(°), the S- and P-polarized component reflectances $Rs(80(°))(\%)$ and $Rp(80(°))(\%)$ are as follows.

$Rs(80(°))(\%)=95(\%)$
$Rp(80(°))(\%)=75(\%)$

The case where the respective S- and P-polarized component ratios $Es^2$ and $Ep^2$ vary is considered. The case where the respective S- and P-polarized component ratios $Es^2$ and $Ep^2$ maximally vary corresponds to a case where $(Es^2=0, Ep^2=1)$ is varied to $(Es^2=1, Ep^2=0)$ or a case where $(Es^2=1, Ep^2=0)$ is varied to $(Es^2=0, Ep^2=1)$. In this case, the deviation from the designed total reflectance $Rg(80)(\%)$ of the S- and P-polarized components is equal to a value of the reflectance difference between the S- and P-polarized component reflectances $Rs(80(°))(\%)$ and $Rp(80(°))(\%)$.

When the respective S- and P-polarized component ratios $Es^2$ and $Ep^2$ maximally vary as described above, the case of the low mirror reflectance (FIG. 6A) is compared with the case of the high mirror reflectance (FIG. 6B). A reflectance change ratio before and after variation is 1.57 times (=55%/35%) in the case of the low mirror reflectance and 1.27 times (=95%/75%) in the case of the high mirror reflectance. As is apparent from the result, even when the S- and P-polarized reflectance difference is 20% in each of the cases, the influence of the variation in the case of the low mirror reflectance is large. However, even when the high-sensitive drum is used, in order to sufficiently increase the driving current of a laser diode (LD) to always operate the laser diode in the LD emission region, it is useful to provide the low-reflectance mirror (turn back reflection mirror) on the optical path.

From the consideration described above, even when the S- and P-polarized reflectance differences are equal to each other, the low-reflectance mirror which is more influenced by the total reflectance of the S- and P-polarized components depending on the deviation in polarized direction is originally provided in a small-incident-angle position in which the S- and P-polarized reflectance difference is small. Therefore, the influence of the deviation in polarized direction is also suppressed.

In this embodiment, in the respective scanning units S1 and S2, the low-reflectance mirrors 16a and 16b each having an on-axis reflectance of approximately 55% are provided in small-incident-angle positions in which an on-axis incident angle is 7°. In addition to this, the high-reflectance mirrors 17a and 17b each having an on-axis reflectance of approximately 80% are provided in large-incident-angle positions in which an on-axis incident angle is 42° and 62°. Therefore, the effect described above is obtained in this embodiment.

In the respective scanning units S1 and S2, the low-reflectance mirror 16a (16b) of the two mirrors 16a and 17a (16b and 17b) is set such that changes in S-polarized reflectance and P-polarized reflectance at an arbitrary incident angle corresponding to an image forming area are maximum. In this embodiment, the two mirrors 16a and 17a (16b and 17b) in the respective scanning units S1 and S2 are set such that a difference between the S-polarized reflectance and the P-polarized reflectance at an arbitrary angle of incident angles corresponding to the image forming area is equal to or smaller than 10%.

Figure 7A:
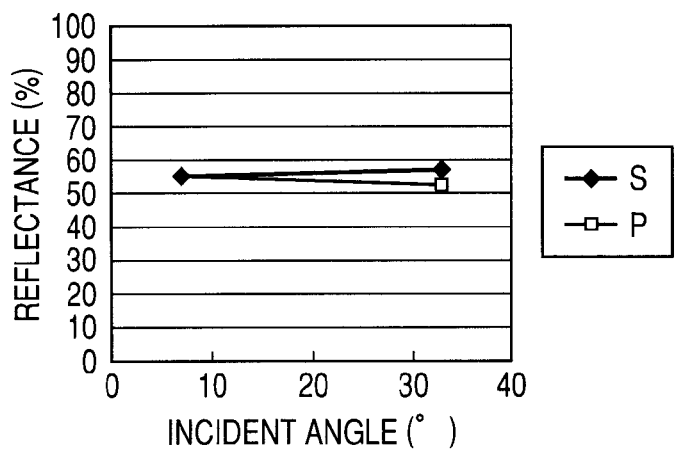
FIGS. 7A, 7B, and 7C are graphs illustrating reflectance characteristics in Embodiment 1 of the present invention.
Figure 7B:
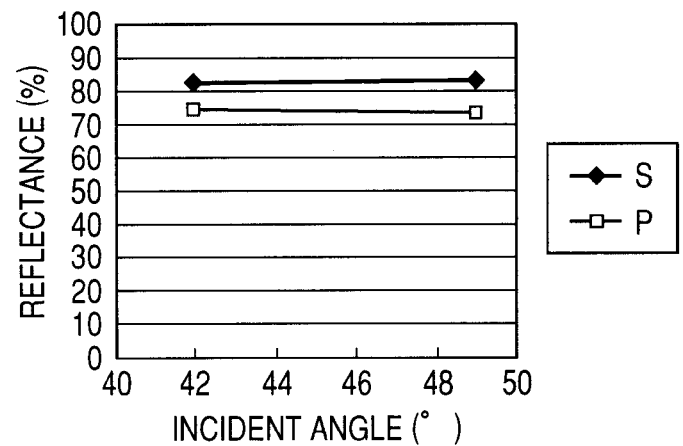
Figure 7C:
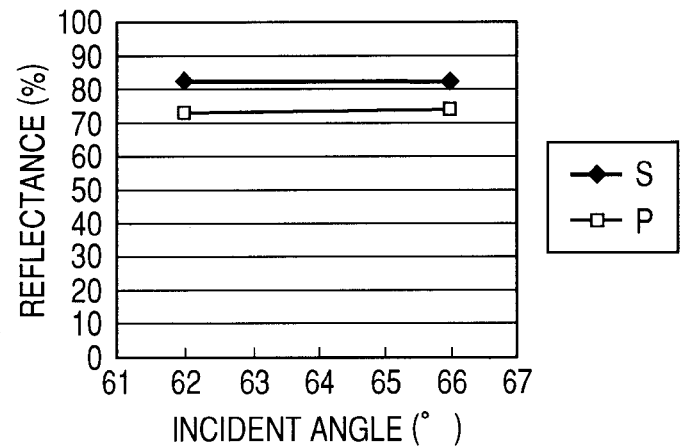

The reflectances of the first and second turn back reflection mirrors 16a, 16b, 17a, and 17b of the respective scanning units S1 and S2 in this embodiment are described with reference to FIGS. 7A to 7C. FIGS. 7A to 7C are graphs illustrating respective reflectance characteristics in Embodiment 1 of the present invention. FIG. 7A is a graph illustrating reflectance characteristics of the first turn back reflection mirrors 16a and 16b of the respective scanning units S1 and S2. FIG. 7B is a graph illustrating a reflectance characteristic of the second turn back reflection mirror 17a of the scanning unit S1. FIG. 7C is a graph illustrating a reflectance characteristic of the second turn back reflection mirror 17b of the scanning unit S2.

The first turn back reflection mirrors 16a and 16b have a common film characteristic. In each of the first turn back reflection mirrors 16a and 16b, the S-polarized reflectance of the on-axis light beam is set to 55% and the P-polarized reflectance thereof is also set to 55%. The S-polarized reflectance of the off axis light beam is set to 57% and the P-polarized reflectance thereof is set to 53%. In this case, the angle of the incident light beam and the polarized direction are taken into account such that the reflectance of the off axis light beam is lower than the reflectance of the on-axis light beam by 4%. Therefore, the reflection films of the first turn back reflection mirrors 16a and 16b are optimized. In contrast to this, film characteristics which are not equal to each other are set for the second turn back reflection mirrors 17a and 17b.

In the second turn back reflection mirror 17a of the scanning unit S1, the S-polarized reflectance of the on-axis light beam is set to 83% and the P-polarized reflectance thereof is set to 73%. The S-polarized reflectance of the off axis light beam is set to 82% and the P-polarized reflectance thereof is set to 74%. In this case, the angle of the incident light beam and the polarized direction are taken into account such that the reflectance of the off axis light beam is lower than the reflectance of the on-axis light beam by 1%. Therefore, the reflection film of the second turn back reflection mirror 17a is optimized.

In the second turn back reflection mirror 17b of the scanning unit S2, the S-polarized reflectance of the on-axis light beam is set to 83% and the P-polarized reflectance thereof is set to 74%. The S-polarized reflectance of the off axis light beam is set to 83% and the P-polarized reflectance thereof is set to 73%. In this case, the angle of the incident light beam and the polarized direction are taken into account such that the reflectance of the off axis light beam is lower than the reflectance of the on-axis light beam by 1%. Therefore, the reflection film of the second turn back reflection mirror 17b is optimized.

Figure 8A:
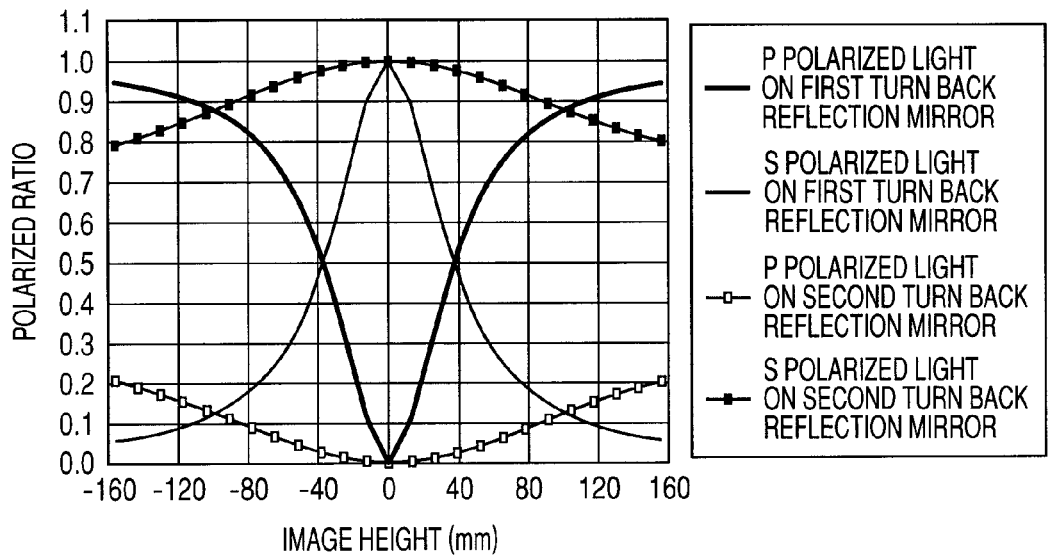
FIGS. 8A and 8B are graphs illustrating P- and S-polarized component ratios in Embodiment 1 of the present invention.
Figure 8B:
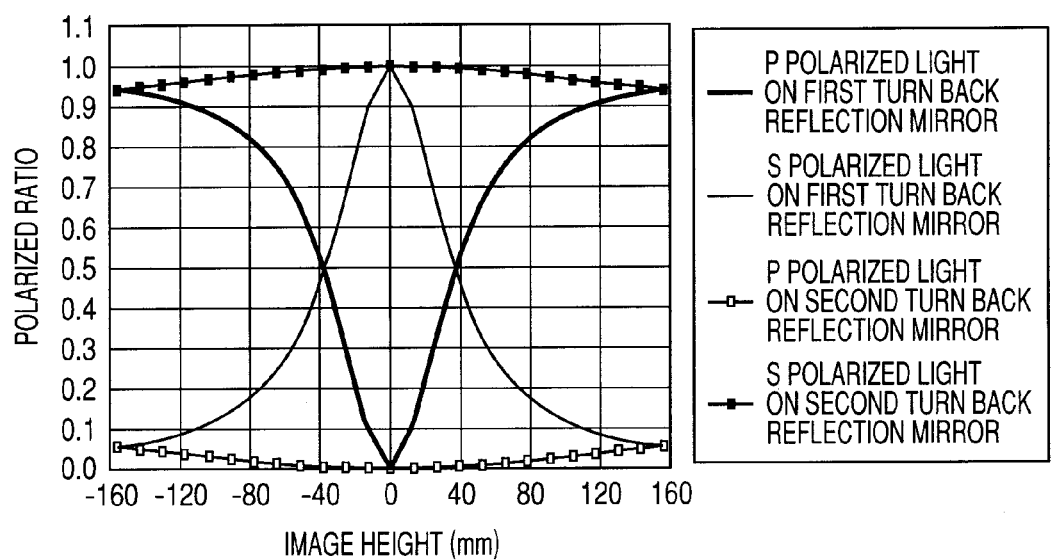

FIGS. 8A and 8B illustrate designed respective S- and P-polarized component ratios $Es^2$ and $Ep^2$. FIG. 8A is a graph illustrating the respective S- and P-polarized component ratios on the scanning unit S1 side. FIG. 8B is a graph illustrating the respective S- and P-polarized component ratios on the scanning unit S2 side. As illustrated in FIGS. 8A and 8B, in the first turn back reflection mirrors 16a and 16b common to the respective scanning units S1 and S2, designed values of polarized component ratios at an image height of 0 mm which corresponds to an on-axis light beam incident angle of 7° are as follows.

$Es^2=1, Ep^2=0$

In contrast to this, the polarized component ratios at an image height of 156 mm which corresponds to an off axis light beam incident angle of 33° are as follows.

$Es^2=0.06, Ep^2=0.94$

In the second turn back reflection mirror 17a of the scanning unit S1, the polarized component ratios at an image height of 0 mm which corresponds to an on-axis light beam incident angle of 42° are as follows.

$Es^2=1, Ep^2=0$

In contrast to this, the polarized component ratios at an image height of 156 mm which corresponds to an off axis light beam incident angle of 49° are as follows.

$Es^2=0.79, Ep^2=0.21$

In the second turn back reflection mirror 17b of the scanning unit S2, the polarized component ratios at an image height of 0 mm which corresponds to an on-axis light beam incident angle of 62° are as follows.

$Es^2=1, Ep^2=0$

In contrast to this, the polarized component ratios at an image height of 156 mm which corresponds to an off axis light beam incident angle of 66° are as follows.

$Es^2=0.94, Ep^2=0.06$

Figure 9A:
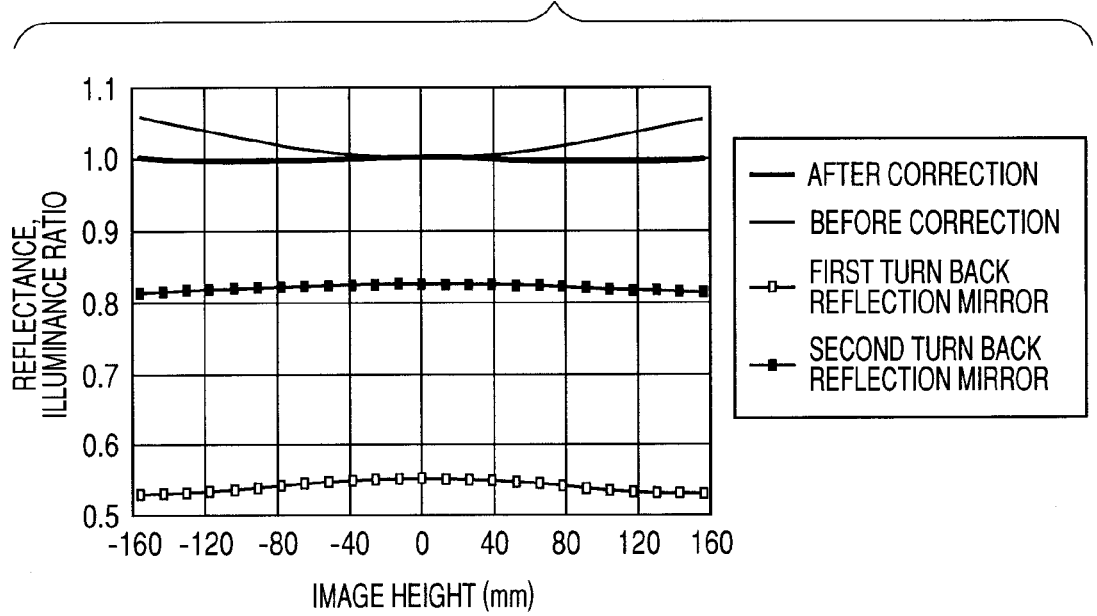
FIGS. 9A and 9B are graphs illustrating reflectances and image plane illuminance ratios in Embodiment 1 of the present invention.
Figure 9B:
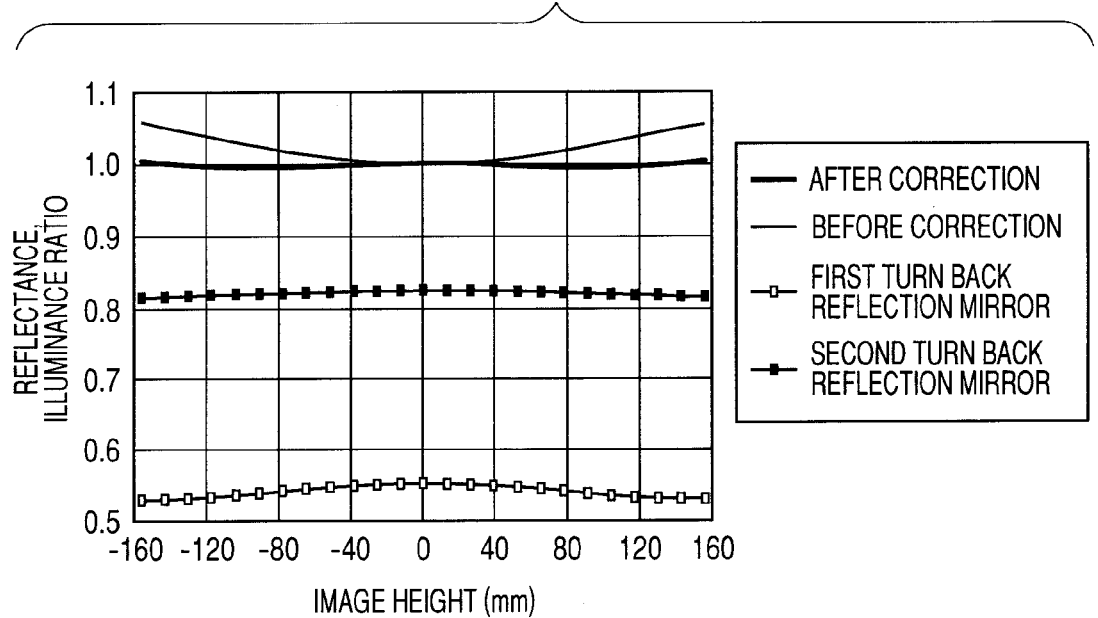

FIGS. 9A and 9B are graphs illustrating reflectances and image plane illuminance ratios (image plane illuminance unevenness) on the surface to be scanned in Embodiment 1 of the present invention. FIG. 9A is a graph illustrating reflectances and image plane illuminance ratios on the scanning unit S1 side and FIG. 9B is a graph illustrating reflectances and image plane illuminance ratios on the scanning unit S2 side. As illustrated in FIGS. 9A and 9B, the amount of light on the off axis (edge portion of image) is increased higher than the amount of light on the on-axis (center of image) by 6% because of the influence of surface reflection (Fresnel reflection) on the imaging optical systems 15a and 15b and the protection-against-dust glasses 14a and 14b (before mirror correction). When a mirror correction component is added, the image plane illuminance unevenness of approximately 6% is reduced to approximately 1% in both the scanning units S1 and S2 (after mirror correction).

Hereinafter, in this embodiment, the influence on the total reflectance of the S- and P-polarized components in the case where the polarized direction is deviated from the design value is determined. To be specific, the influence of the deviation in polarized direction which is caused by birefringence of the imaging lenses 6a and 6b of the respective scanning units S1 and S2 is determined.

Figure 10:
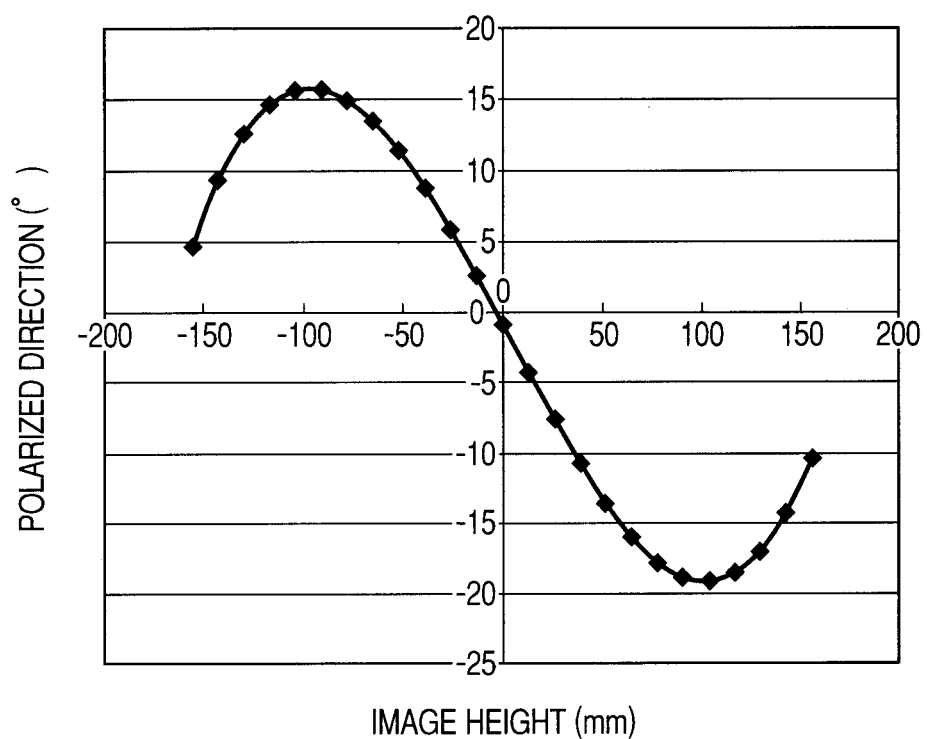
FIG. 10 is a graph illustrating a deviation in polarized direction which is caused by birefringence in Embodiment 1 of the present invention.

FIG. 10 is a graph obtained by measuring the deviation in polarized direction which is caused by the influence of birefringence of the imaging lenses 6a and 6b. In a method of measuring the deviation in polarized direction, while a deflecting plate provided for light beams exited from the imaging lenses is rotated, the amount of light passing through the deflecting plate is measured to read rotational angles of the deflecting plate which correspond to a maximum light amount and a minimum light amount, to thereby estimate the deviation in polarized direction. The measuring method is not limited to this method. A method using not the deflecting plate but a calcite polarizing element, for example, a Glan-Thompson prism may be also employed.

The influence on the total reflectance of the S- and P-polarized components is determined based on the measured amount of deviation in polarized direction as illustrated in FIG. 10. Hereinafter, a comparative example is introduced for comparison with this embodiment. The comparative example is described below.

Comparative Example for Embodiment 1

In contrast to Embodiment 1, in the comparative example, the low-reflectance mirrors each having an on-axis reflectance of approximately 55% are provided in the large-incident-angle positions in which the on-axis incident angle is 42° and 62°. The high-reflectance mirrors each having an on-axis reflectance of approximately 90% are provided in the small-incident-angle positions in which an on-axis incident angle is 7°.

Figure 11A:
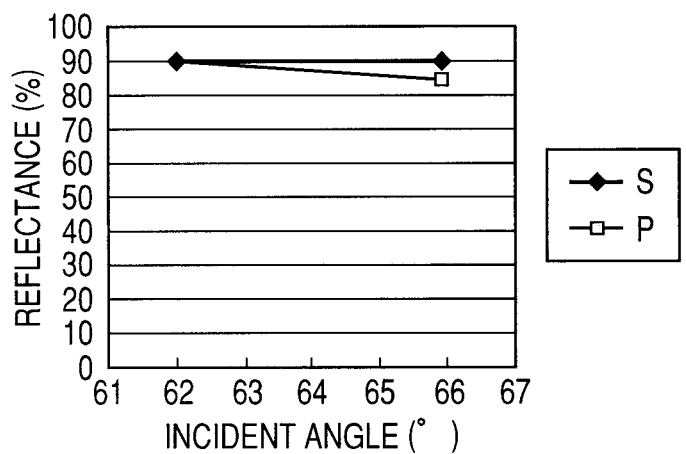
FIGS. 11A, 11B, and 11C are graphs illustrating reflectance characteristics in a comparative example of the present invention.
Figure 11B:
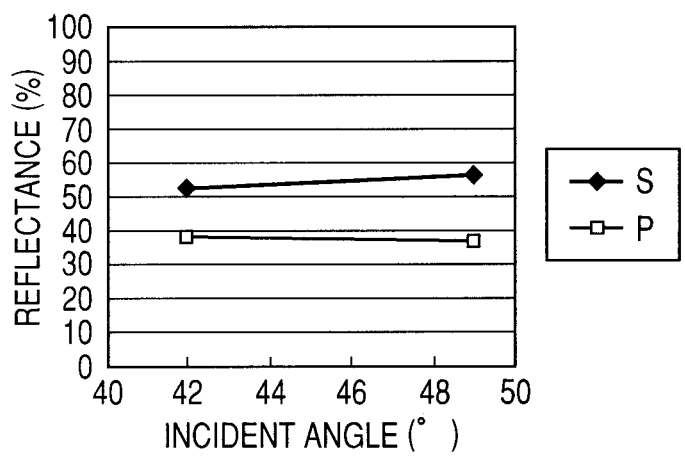
Figure 11C:
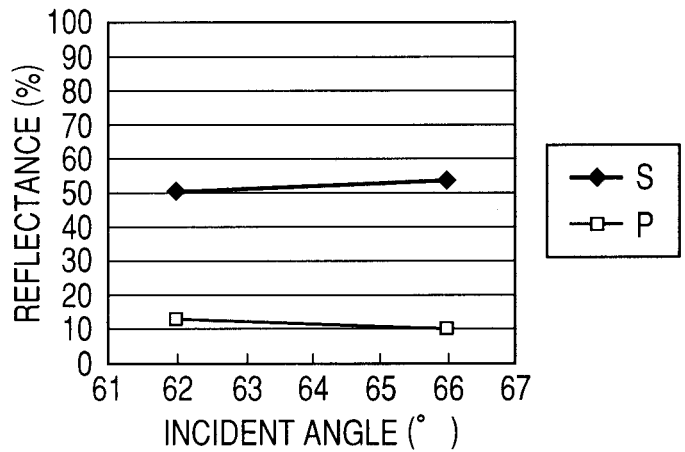

Reflectances of the first and second turn back reflection mirrors in this comparative example are described with reference to FIGS. 11A to 11C. FIGS. 11A to 11C are graphs illustrating respective reflectance characteristics in this comparative example. FIG. 11A is a graph illustrating reflectance characteristics of the first turn back reflection mirrors 16a and 16b of the respective scanning units S1 and S2. FIG. 11B is a graph illustrating a reflectance characteristic of the second turn back reflection mirror 17a of the scanning unit S1. FIG. 11C is a graph illustrating a reflectance characteristic of the second turn back reflection mirror 17b of the scanning unit S2. As compared with Embodiment 1, the film characteristics of the first and second return back reflection mirrors are not changed, and hence the representations including the reference symbols stay the same.

In this comparative example, the first turn back reflection mirrors 16a and 16b of the respective scanning units S1 and S2 have a common film characteristic. In each of the first turn back reflection mirrors 16a and 16b, the S-polarized reflectance of the on-axis light beam is set to 90% and the P-polarized reflectance thereof is also set to 90%. The S-polarized reflectance of the off axis light beam is set to 90% and the P-polarized reflectance thereof is set to 85%. In this case, the angle of the incident light beam and the polarized direction are taken into account such that the reflectance of the off axis light beam is lower than the reflectance of the on-axis light beam by 5%. Therefore, the reflection films of the first turn back reflection mirrors 16a and 16b are optimized.

In contrast to this, film characteristics which are not equal to each other are set for the second turn back reflection mirrors 17a and 17b of the respective scanning units S1 and S2 in this comparative example. In the second turn back reflection mirror 17a of the scanning unit S1, the S-polarized reflectance of the on-axis light beam is set to 53% and the P-polarized reflectance thereof is set to 39%. The S-polarized reflectance of the off axis light beam is set to 56% and the P-polarized reflectance thereof is set to 37%. In this case, the angle of the incident light beam and the polarized direction are taken into account such that the reflectance of the off axis light beam is equal to the reflectance of the on-axis light beam. Therefore, the reflection film of the second turn back reflection mirror 17a is optimized.

In the second turn back reflection mirror 17b of the scanning unit S2, the S-polarized reflectance of the on-axis light beam is set to 51% and the P-polarized reflectance thereof is set to 13%. The S-polarized reflectance of the off axis light beam is set to 54% and the P-polarized reflectance thereof is set to 10%. In this case, the angle of the incident light beam and the polarized direction are taken into account such that the reflectance of the off axis light beam is equal to the reflectance of the on-axis light beam. Therefore, the reflection film of the second turn back reflection mirror 17b is optimized. Designed respective S- and P-polarized component ratios $Es^2$ and $Ep^2$ in this comparative example are the same as those illustrated in FIGS. 8A and 8B.

As illustrated in FIGS. 8A and 8B, in the first turn back reflection mirrors 16a and 16b common to the respective scanning units S1 and S2, the designed values of the polarized component ratios at the image height of 0 mm which corresponds to the on-axis light beam incident angle of 7° are as follows.

$Es^2=1$, $Ep^2=0$

In contrast to this, the polarized component ratios at the image height of 156 mm which corresponds to the off axis light beam incident angle of 33° are as follows.

$Es^2=0.06$, $Ep^2=0.94$

In the second turn back reflection mirror 17a of the scanning unit S1, the polarized component ratios at the image height of 0 mm which corresponds to the on-axis light beam incident angle of 42° are as follows.

$Es^2=1$, $Ep^2=0$

In contrast to this, the polarized component ratios at the image height of 156 mm which corresponds to the off axis light beam incident angle of 49° are as follows.

$Es^2=0.79$, $Ep^2=0.21$

In the second turn back reflection mirror 17b of the scanning unit S2, the polarized component ratios at the image height of 0 mm which corresponds to the on-axis light beam incident angle of 62° are as follows.

$Es^2=1$, $Ep^2=0$

In contrast to this, the polarized component ratios at the image height of 156 mm which corresponds to the off axis light beam incident angle of 66° are as follows.

$Es^2=0.94$, $Ep^2=0.06$

Figure 12A:
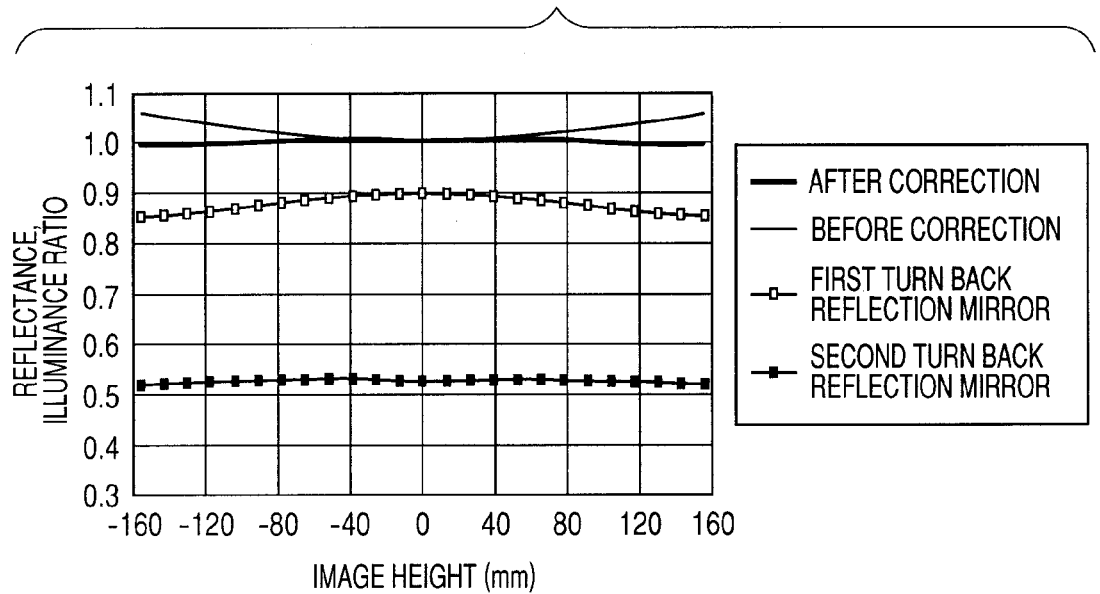
FIGS. 12A and 12B are graphs illustrating reflectances and image plane illuminance ratios in the comparative example of the present invention.
Figure 12B:
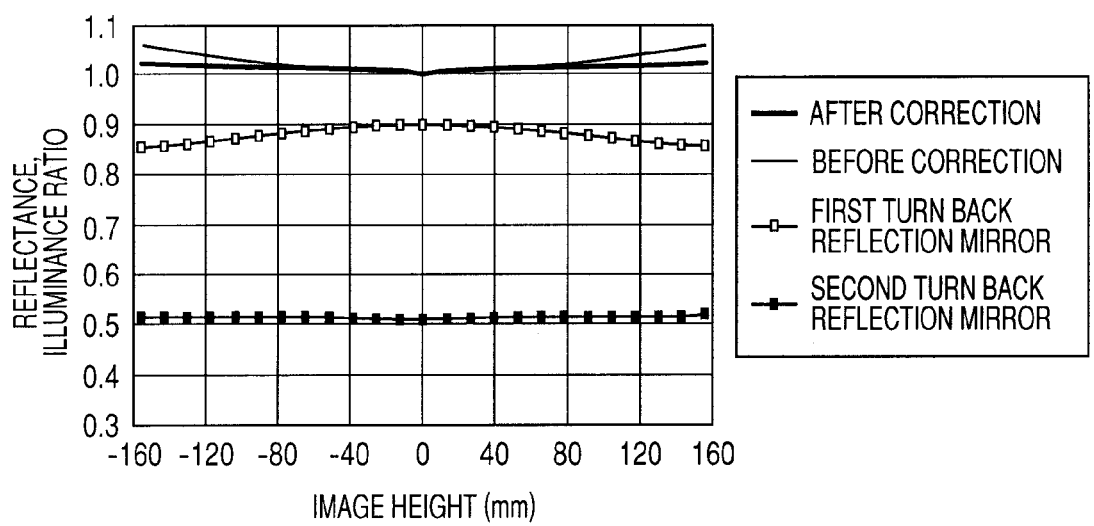

FIGS. 12A and 12B are graphs illustrating reflectances and image plane illuminance ratios (image plane illuminance unevenness) on the surface to be scanned in this comparative example. FIG. 12A is a graph illustrating reflectances and image plane illuminance ratios on the scanning unit S1 side and FIG. 12B is a graph illustrating reflectances and image plane illuminance ratios on the scanning unit S2 side. When the setting described above is made, the image plane illuminance unevenness of approximately 6% which is caused by surface reflection (Fresnel reflection) on the imaging optical systems 15a and 15b and the protection-against-dust glasses 14a and 14b is reduced to approximately 2% by introducing the mirrors in this comparative examples to the scanning units S1 and S2 (after correction).

Figure 13A:
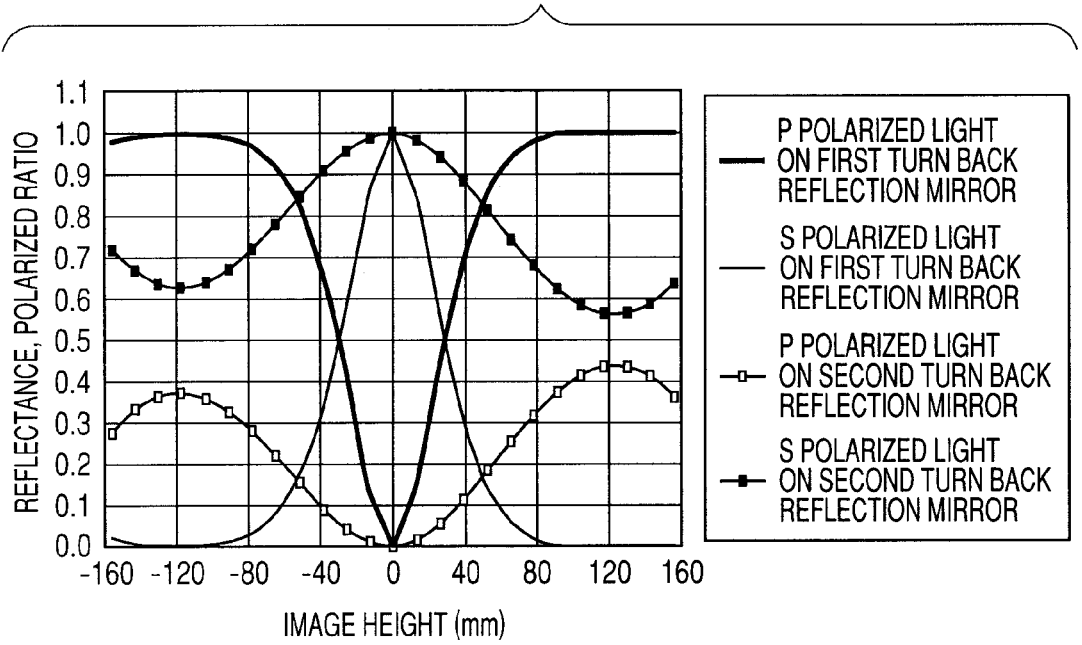
FIGS. 13A and 13B are graphs illustrating P- and S-polarized component ratios in the comparative example of the present invention in a case where a deviation in polarized direction is taken into account.
Figure 13B:
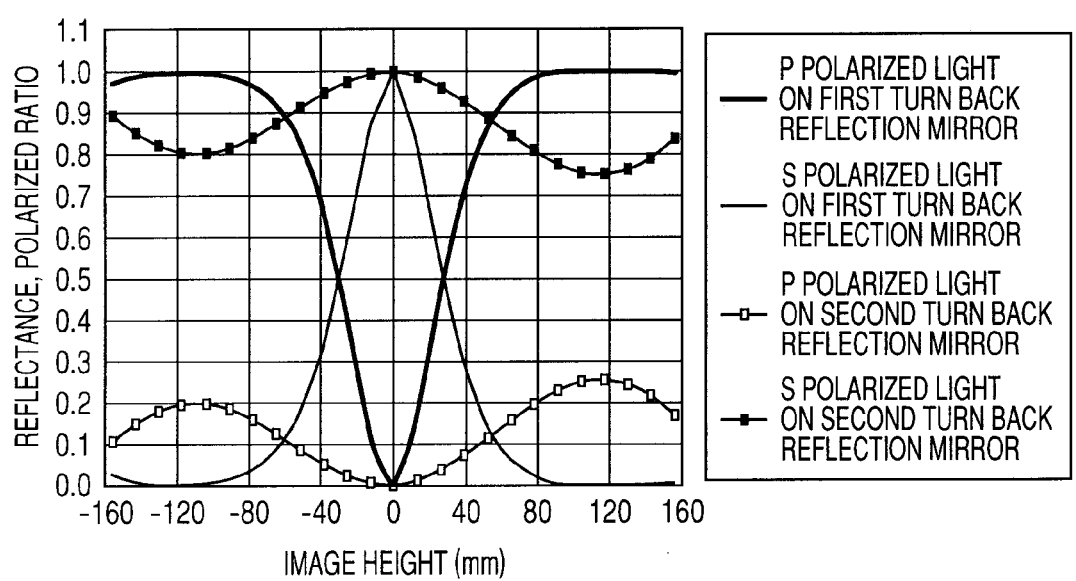

In this comparative example, the respective S- and P-polarized component ratios $Es^2$ and $Ep^2$ in the case where the amount of deviation in polarized direction as illustrated in FIG. 10 is caused are obtained from Expressions (8) and (9) as illustrated in FIGS. 13A and 13B. FIGS. 13A and 13B are graphs illustrating the respective P- and S-polarized component ratios in this comparative example in the case where the deviation in polarized direction is taken into account. FIG. 13A illustrates the scanning unit S1 side and FIG. 13B illustrates the scanning unit S2 side.

Figure 14A:
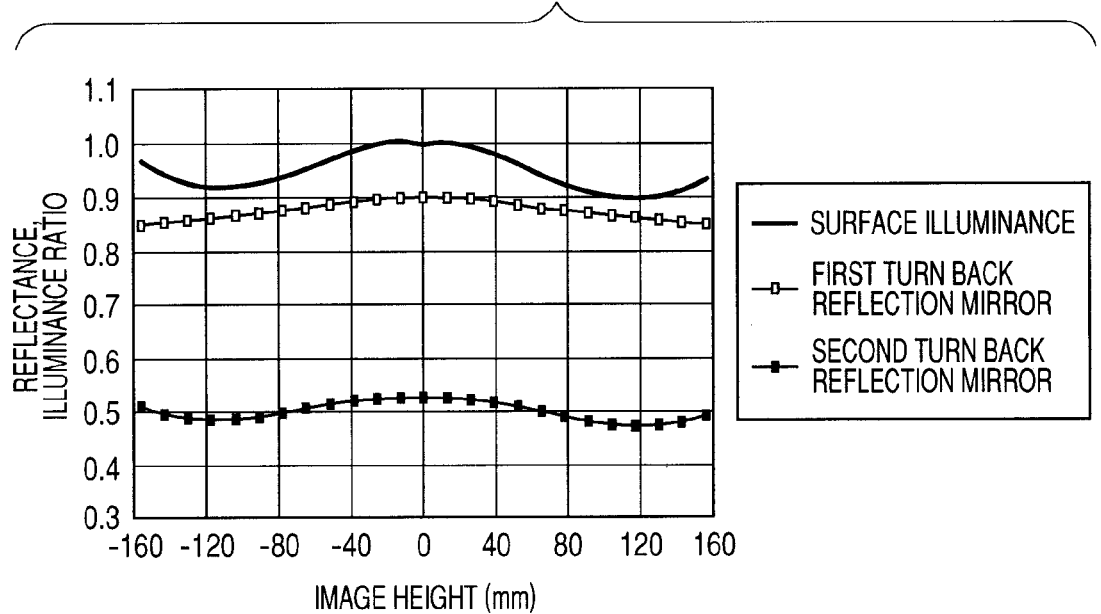
FIGS. 14A and 14B are graphs illustrating image plane illuminance ratios in the comparative example of the present invention in the case where the deviation in polarized direction is taken into account.
Figure 14B:
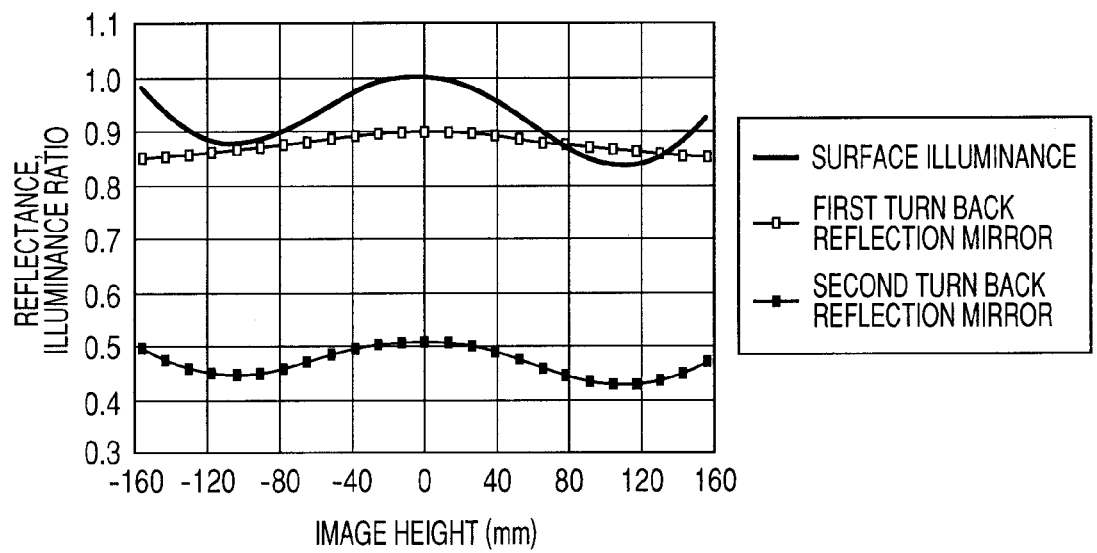

FIGS. 14A and 14B are graphs illustrating the respective P- and S-polarized component ratios obtained as illustrated in FIGS. 13A and 13B and image plane illuminance ratios (image plane illuminance unevenness) on the surface to be scanned in this comparative example, which are obtained from Expression (10). The graph of FIG. 14A illustrates the scanning unit S1 side and the graph of FIG. 13B illustrates the scanning unit S2 side.

As is apparent from the results, when the image plane illuminance at the image height of 0 mm which corresponds to the on-axis light beam is normalized, light amount unevenness in the scanning unit S1 is maximized in the vicinity of an image height of +117 mm and the amount of light is reduced by 11%. Even in the scanning unit S2, the amount of light is reduced by 17% in the vicinity of the image height of +117 mm.

(Image Plane Illuminance Unevenness in Embodiment 1)

The image plane illuminance unevenness in the case where the polarized direction is deviated in Embodiment 1 is considered. In order to set the same comparison condition, the deviation in polarized direction which is provided is the same as provided in the comparative example.

Figure 15A:
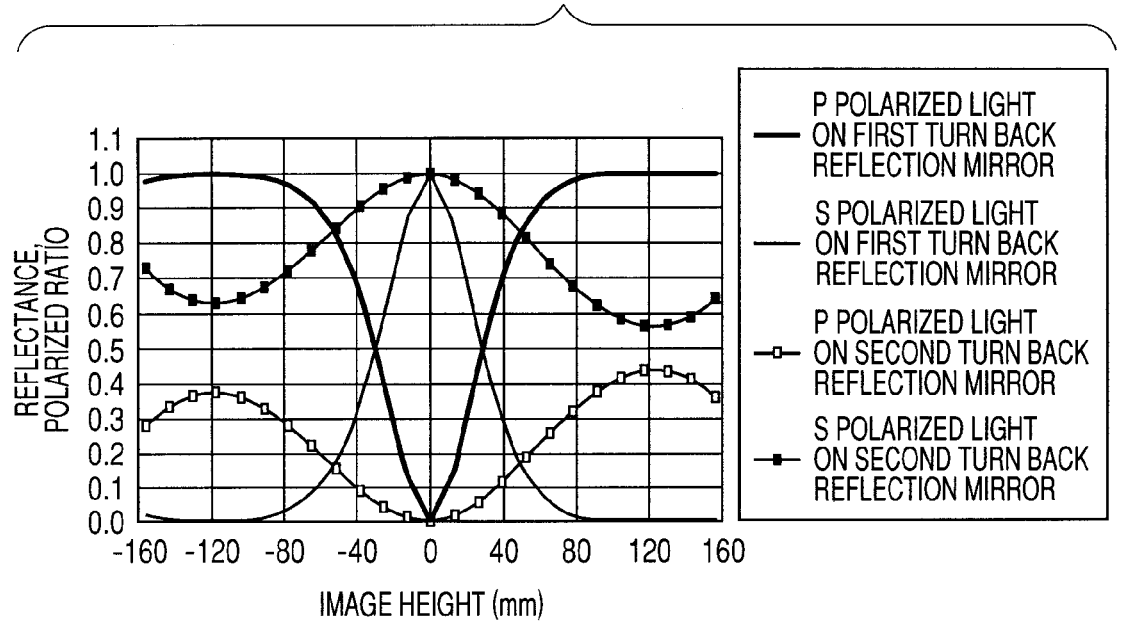
FIGS. 15A and 15B are graphs illustrating P- and S-polarized component ratios in Embodiment 1 of the present invention in the case where the deviation in polarized direction is taken into account.
Figure 15B:
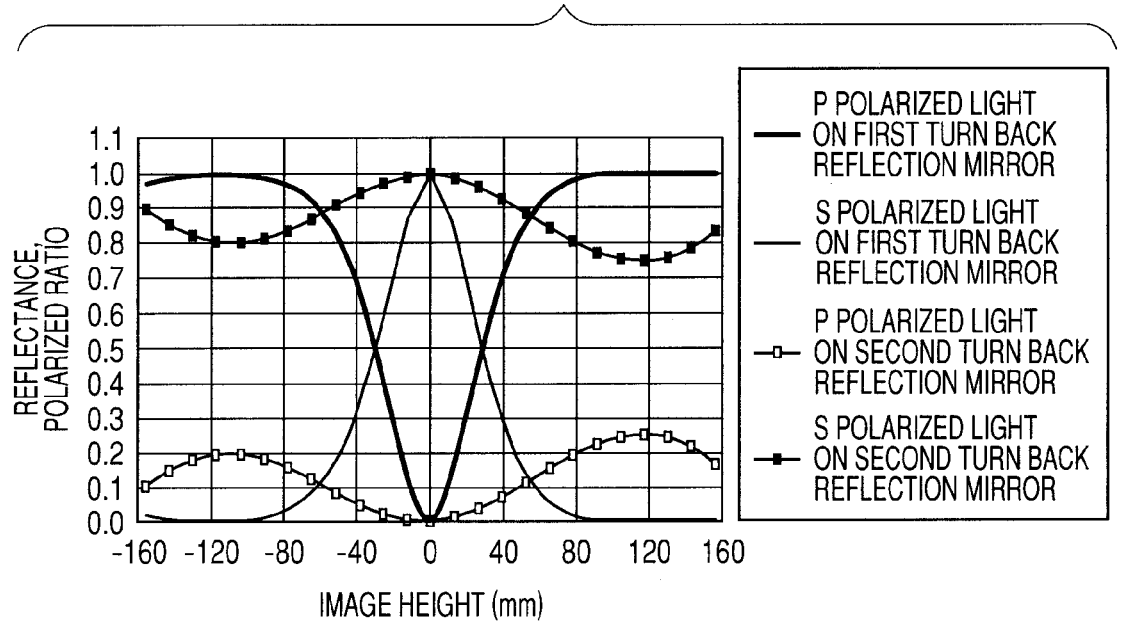

In Embodiment 1, the respective S- and P-polarized component ratios $Es^2$ and $Ep^2$ in the case where the amount of deviation in polarized direction as illustrated in FIG. 10 is caused are obtained from Expressions (8) and (9) as illustrated in FIGS. 15A and 15B. FIGS. 15A and 15B are graphs illustrating respective P- and S-polarized component ratios in Embodiment 1 of the present invention in the case where the deviation in polarized direction is taken into account. FIG. 15A illustrates the scanning unit S1 side and FIG. 15B illustrates the scanning unit S2 side.

Figure 16A:
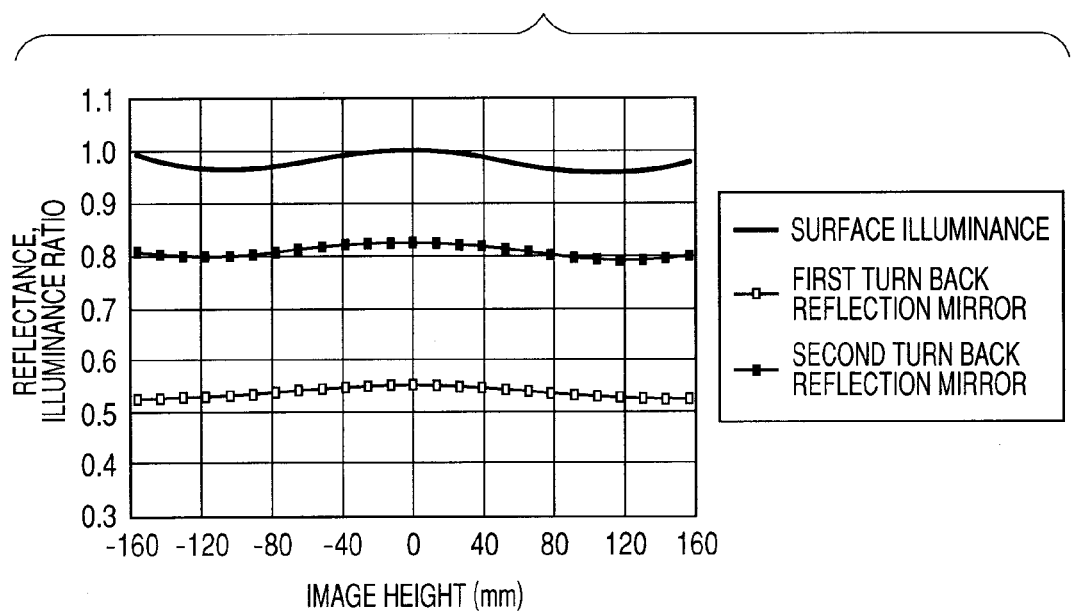
FIGS. 16A and 16B are graphs illustrating image plane illuminance ratios in Embodiment 1 of the present invention in the case where the deviation in polarized direction is taken into account.
Figure 16B:
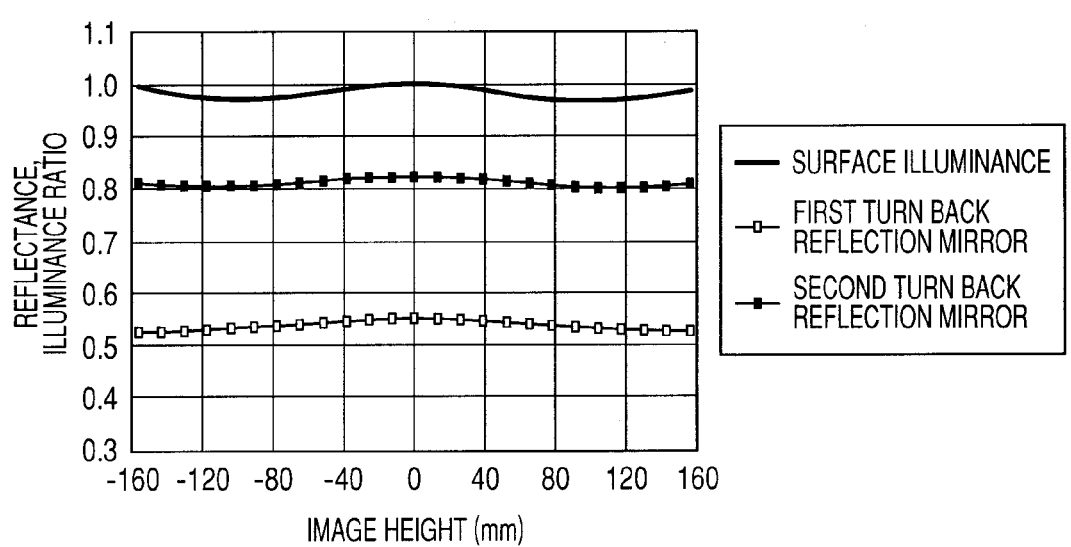

FIGS. 16A and 16B are graphs illustrating the P- and S-polarized component ratios obtained as illustrated in FIGS. 15A and 15B and image plane illuminance ratios (image plane illuminance unevenness) on the surface to be scanned in this comparative example, which are obtained from Expression (10). The graph of FIG. 16A illustrates the scanning unit S1 side and the graph of FIG. 16B illustrates the scanning unit S2 side.

As is apparent from the results, when the image plane illuminance at the image height of 0 mm which corresponds to the on-axis light beam is normalized, light amount unevenness in the scanning unit S1 is maximized in the vicinity of an image height of +117 mm and the amount of light is reduced by 4%. Even in the scanning unit S2, the amount of light is reduced by 3% in the vicinity of the image height of +117 mm. Therefore, it is apparent that the image plane illuminance unevenness in this embodiment is suppressed as compared with the comparative example.

As described above, according to this embodiment, the mirrors having the minimum reflectance are provided in the positions in which the on-axis incident angle is minimum in the scanning units each including at least two turn back reflection mirrors, and hence the image plane illuminance unevenness due to the deviation in polarized direction which is caused by birefringence may be suppressed.

The inventors of the present invention found that the effect described above may be used in the case where the reflectance of the mirror having the minimum reflectance is equal to or smaller than 70% in all areas for image formation, from the comparison between this embodiment and the comparative example. The inventors of the present invention also found that the effect described above may be used in the case where, in the optical path changing element of which the on-axis light beam incident angle is minimum, the incident angle is equal to or smaller than 15°, from the comparison between this embodiment and the comparative example. Hereinafter, in this embodiment, the mirror of which the S-polarized on-axis reflectance is equal to smaller than 70% is also referred to as a "low-reflectance turn back reflection mirror" for the sake of convenience.

In this embodiment, in the respective scanning units A1 and S2, only the imaging optical systems 15a and 15b, and the surface reflection (Fresnel reflection) components of the protection-against-dust glasses 14a and 14b are taken into consideration. However, in actuality, there are the image plane illuminance unevenness occurring due to the characteristic of the incident angle on the deflecting surfaces 5a and 5b in the optical deflector 5 and a difference in diffraction efficiency of a diffraction optical element, and the image plane illuminance unevenness due to internal absorption of the imaging optical systems 15a and 15b. Further, there is the image plane illuminance unevenness occurring in using an overfield optical system (OFS), which may be also corrected. The overfield optical system applied to the present invention is directed to an optical system in which the light beam enters in a state where the width of the light beam entering the deflecting surfaces 5a and 5b in the main scanning direction is larger than the width of the deflecting surfaces 5a and 5b in the main scanning direction.

In this embodiment, it is preferred that the image plane illuminance ratio on the surface to be scanned fall within ±5% in the effective scanning area on the basis of the on-axis image plane illuminance. Further, in this embodiment, two turn back reflection mirrors are disposed in the optical path, but three or more turn back reflection mirrors may be disposed therein. Further, a reflective optical element (curved mirror) having an optical power, such as a cylindrical mirror may be used in the optical path.

As described above, in this embodiment, the reflectance of the turn back reflection mirrors is continuously changed by the incident angle and the polarized direction as described above. In this embodiment, the image plane illuminance unevenness on the surface to be scanned is corrected, and a difference in the image plane illuminance unevenness may be more reduced among multiple scanning units. As a result, the scanning optical apparatus which obtains a high-definition image and is compact is achieved.

As illustrated in FIGS. 9A and 9B, in this embodiment, the image plane illuminance ratio on the surface to be scanned is corrected to fall within ±5% in the effective scanning area with respect to the on-axis image plane illuminance. Further, as illustrated in FIGS. 16A and 16B, in this embodiment, even when a deviation in polarized direction occurs, the image plane illuminance ratio on the surface to be scanned is corrected to fall within ±5% in the effective scanning area with respect to the on-axis image plane illuminance.

In this embodiment, when the scanning optical apparatus is used for the image forming apparatus forming two-color images, only one scanning optical apparatus may be used. When the scanning optical apparatus is used for a color image forming apparatus forming four-color images, an image may be formed by using two scanning optical apparatus as described later.

(Color Image Forming Apparatus)

FIG. 17 is a schematic diagram illustrating the main portion of a color image forming apparatus according to the present invention, and illustrates multiple scanning optical apparatus illustrated in FIG. 1. In FIG. 17, two scanning optical apparatus are arranged in parallel, and four scanning lines in total are drawn on the surface to be scanned by two optical deflectors 5L and 5R. As illustrated in FIG. 17, in respective scanning units S1 to S4, four light beams which are deflectively scanned by the optical deflector 5 and pass through first imaging lenses 6a, 6b, 6c, and 6d enter respective corresponding turn back reflection mirrors 16a, 16b, 16c, and 16d at an on-axis incident angle of 7°. Light beams reflected on the turn back reflection mirrors 16a and 16c enter corresponding turn back reflection mirrors 17a and 17c at an on-axis incident angle of 42° through respective corresponding imaging lenses 7a and 7c. In contrast to this, light beams reflected on the turn back reflection mirrors 16b and 16d enter corresponding turn back reflection mirrors 17b and 17d at an on-axis incident angle of 62° through respective corresponding imaging lenses 7b and 7d. After that, light beams reflected on the turn back reflection mirrors 17a, 17b, 17c, and 17d are guided onto surfaces of corresponding photosensitive drums 8a, 8b, 8c, and 8d.

Further, in this embodiment, as illustrated in FIG. 1, the cylindrical lenses 4a and 4b of the first and second scanning units S1 and S2 are disposed, independently. However, the present invention is not limited to this configuration, and, for example, the cylindrical lens may be integrally molded with a plastic mold. Further, in the first and second scanning units S1 and S2, the light beams from the light source units 1a and 1b may be guided directly to the optical deflector 5 through the aperture stops 2a and 2b without using the collimator lenses 3a and 3b, and the cylindrical lenses 4a and 4b.

Further, in this embodiment, the imaging optical systems 15a and 15b are each formed of two lenses, but may be formed of one or three or more lenses. Further, in this embodiment, a case in which the number of deflecting surfaces of the optical deflector 5 (polygon mirror) is six has been described. However, the present invention is not limited to the above-mentioned configuration, but the same effects may be obtained in the case where the number of deflecting surfaces is three or more (for example, four, five, or seven surfaces).

In this embodiment, the rotary polygon mirror is used as the deflecting unit 5. Alternatively, there may be used a reciprocating (vibration) deflecting element having mirror surfaces on both sides in which the deflecting surface 5a reciprocates with the axis 5c as a rotation-axis to deflectively reflect (deflectively scan) the light beam toward the surfaces to be scanned 8a and 8b. Further, in this embodiment, two incident light beams enter the deflecting surfaces 5a and 5b not adjacent to each other, from the same direction. However, the present invention is not limited to this configuration, and the same effects may be obtained even when the incident directions are different, or when the light beams enter the adjacent deflecting surfaces.

Further, in this embodiment, the optical deflector 5 rotates clockwise. However, the present invention is not limited to this configuration, and the same effects may be obtained even with a counterclockwise rotation. Similarly, in this situation, it is preferred that a part of the BD light beam on the "upstream side" with respect to a direction B along which a spot imaged on the surfaces to be scanned 8a and 8b is scanned, that is, on the image write start side, which is out of the image formation light beam, be used as the BD light beam. In this embodiment, the multiple deflecting surfaces 5a and 5b of the single optical deflector 5 are used to deflectively scan the two surfaces to be scanned with the light beams from the single optical deflector 5. However, the present invention is not limited to this. Even in a case of a scanning optical apparatus for deflectively scanning the single surface to be scanned with the light beam using the single deflecting surface of the single optical deflector 5, the same effect may be obtained.

In this embodiment, the optical axis of the incident optical system corresponds to the incident direction perpendicular to the rotational axis of the optical deflector 5. However, the present invention is not limited to this. Even when setting is made such that the incident direction is not perpendicular, the same effect may be obtained.

In this embodiment, the light beam oscillation direction is set such that the polarized direction of the on-axis light beam entering the first turn back reflection mirror is the S-polarized direction. However, the present invention is not limited to this. Even when the light beam oscillation direction is set such that that the polarized direction of the on-axis light beam entering the first turn back reflection mirror is the P-polarized direction, the same effect may be obtained.

In this embodiment, the light source unit is the single light emitting portion (light emitting point). However, the present invention is not limited to this. Even when a multi-beam semiconductor laser (multi-beam light source) including multiple light emitting portions is provided, the same effect may be obtained. One of the advantages of the use of the multi-beam light source is that high-speed printing or high-definition printing may be achieved without an increase in speed of the optical deflector which causes noise or vibration.

As described above, according to this embodiment, the size of the entire apparatus is reduced with advantage. In addition, even when the polarized direction is deviated, the turn back reflection mirror having the low reflectance is used, and hence the unevenness of the illuminance distribution (light amount distribution) on the surface to be scanned may be reduced to form a high-quality image.

Embodiment 2

Next, Embodiment 2 of the present invention is described. A main scanning section of a scanning optical apparatus according to Embodiment 2 is equal to the main scanning section illustrated in FIG. 1 in Embodiment 1. A sub scanning section in Embodiment 2 is also equal to the sub scanning section illustrated in FIG. 2 in Embodiment 1.

This embodiment is different from Embodiment 1 described above in the point that the second turn back reflection mirror 17a of the scanning unit S1 and the second turn back reflection mirror 17b of the scanning unit S2 have a common film characteristic. The other structures and numerical values related to optical characteristics are the same as in Embodiment 1 and thus the same effect as in Embodiment 1 is obtained.

Figure 18A:
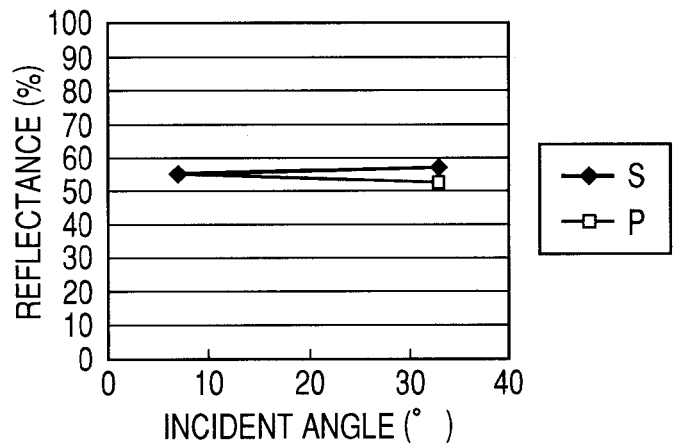
FIGS. 18A, 18B, and 18C are graphs illustrating reflectance characteristics in Embodiment 2 of the present invention.
Figure 18B:
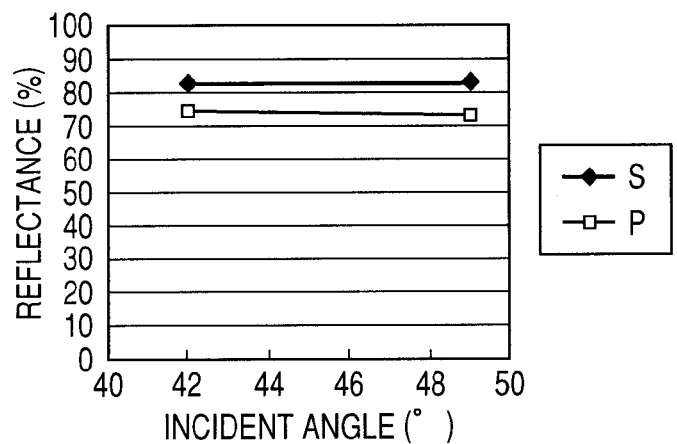
Figure 18C:
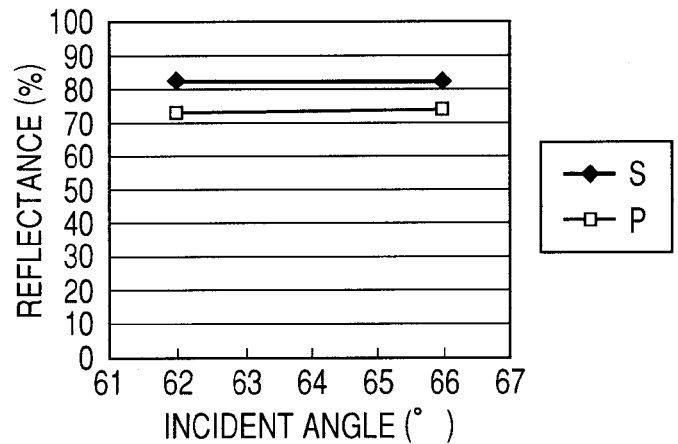

FIGS. 18A, 18B, and 18C are graphs illustrating reflectance characteristics in Embodiment 2 of the present invention. FIG. 18A is a graph illustrating reflectance characteristics of the first turn back reflection mirrors 16a and 16b of the respective scanning units S1 and S2. FIG. 18B is a graph illustrating reflectance characteristics of the second turn back reflection mirror 17a of the scanning unit S1. FIG. 18C is a graph illustrating reflectance characteristics of the second turn back reflection mirror 17b of the scanning unit S2.

The first turn back reflection mirrors 16a and 16b of the respective scanning units S1 and S2 in this embodiment are equal to the first turn back reflection mirrors in Embodiment 1 described above and optical functions are the same as in Embodiment 1. In contrast to this, unlike Embodiment 1, the same film characteristic is set for the second turn back reflection mirrors 17a and 17b of the respective scanning units S1 and S2 in this embodiment. In the second turn back reflection mirror 17a of the scanning unit S1, the S-polarized reflectance of the on-axis light beam is set to 83% and the P-polarized reflectance thereof is set to 74%. The S-polarized reflectance of the off axis light beam is set to 83% and the P-polarized reflectance thereof is set to 73%. In this case, the angle of the incident light beam and the polarized direction are taken into account such that the reflectance of the off axis light beam is lower than the reflectance of the on-axis light beam by 1%. Therefore, the reflection film of the second turn back reflection mirror 17a is optimized. In the second turn back reflection mirror 17b of the scanning unit S2, the S-polarized reflectance of the on-axis light beam is set to 82% and the P-polarized reflectance thereof is set to 73%. The S-polarized reflectance of the off axis light beam is set to 82% and the P-polarized reflectance thereof is set to 74%. In this case, the angle of the incident light beam and the polarized direction are taken into account such that the reflectance of the off axis light beam is lower than the reflectance of the on-axis light beam by 1%. Therefore, the reflection film of the second turn back reflection mirror 17b is optimized. Designed respective S- and P-polarized component ratios $Es^2$ and $Ep^2$ in this embodiment are the same as in Embodiment 1, and thus are the same as illustrated in FIGS. 8A and 8B.

Figure 19A:
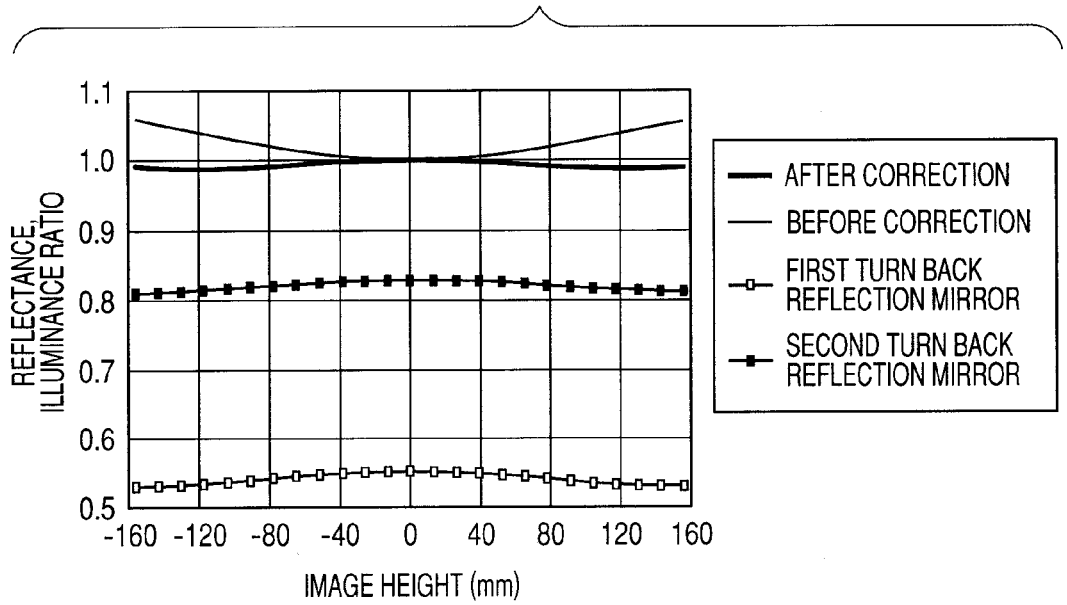
FIGS. 19A and 19B are graphs illustrating reflectances and image plane illuminance ratios in Embodiment 2 of the present invention.
Figure 19B:
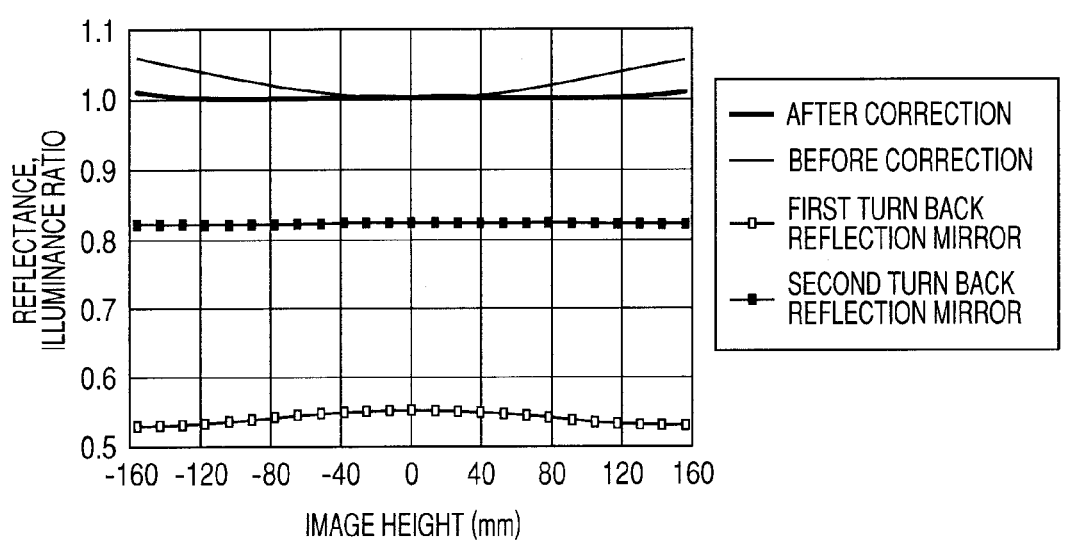

FIGS. 19A and 19B are graphs illustrating reflectances and image plane illuminance ratios (image plane illuminance unevenness) in Embodiment 2 of the present invention. FIG. 19A is a graph illustrating reflectances and image plane illuminance ratios on the scanning unit S1 side and FIG. 19B is a graph illustrating reflectances and image plane illuminance ratios on the scanning unit S2 side.

When the setting described above is made, the image plane illuminance unevenness of approximately 6% which is caused by surface reflection (Fresnel reflection) on the imaging optical systems 15a and 15b and the protection-against-dust glasses 14a and 14b is reduced to approximately 1% by introducing the mirrors in this embodiment to the scanning units S1 and S2 (after correction).

Figure 20A:
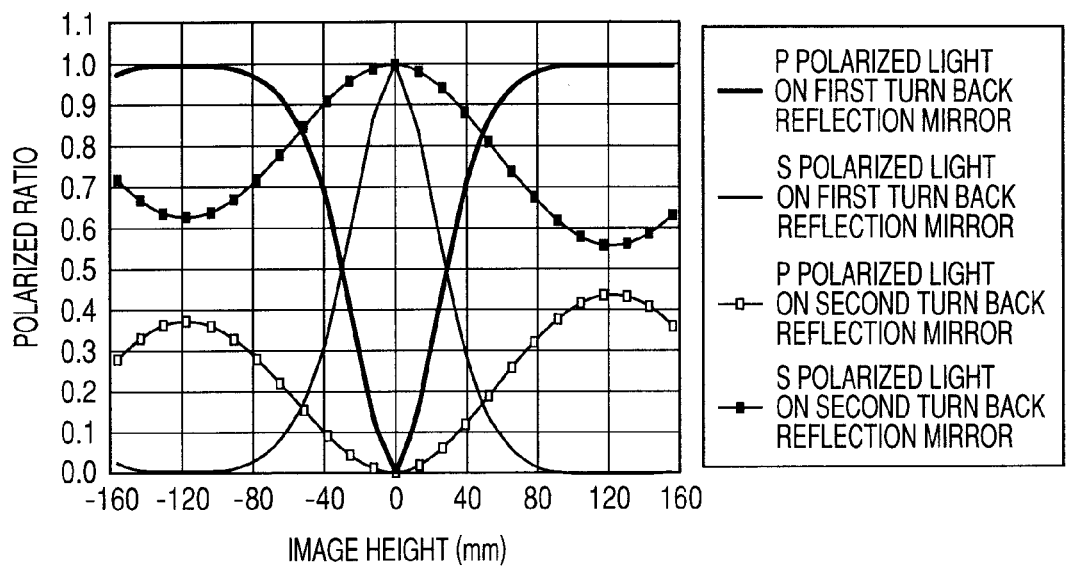
FIGS. 20A and 20B are graphs illustrating P- and S-polarized component ratios in Embodiment 2 of the present invention in the case where a deviation in polarized direction is taken into account.
Figure 20B:
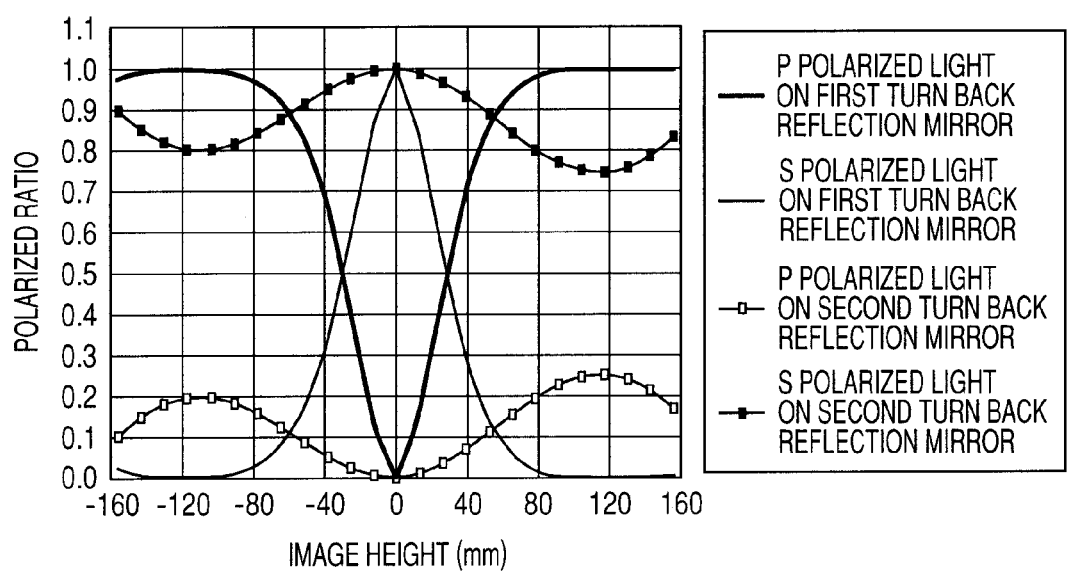

In Embodiment 2, the respective S- and P-polarized component ratios $Es^2$ and $Ep^2$ in the case where the amount of deviation in polarized direction as illustrated in FIG. 10 is caused are obtained from Expressions (8) and (9) as illustrated in FIGS. 20A and 20B. FIGS. 20A and 20B are graphs illustrating the respective P- and S-polarized component ratios in Embodiment 2 of the present invention in the case where the deviation in polarized direction is taken into account. FIG. 20A illustrates the scanning unit S1 side and FIG. 20B illustrates the scanning unit S2 side.

Figure 21A:
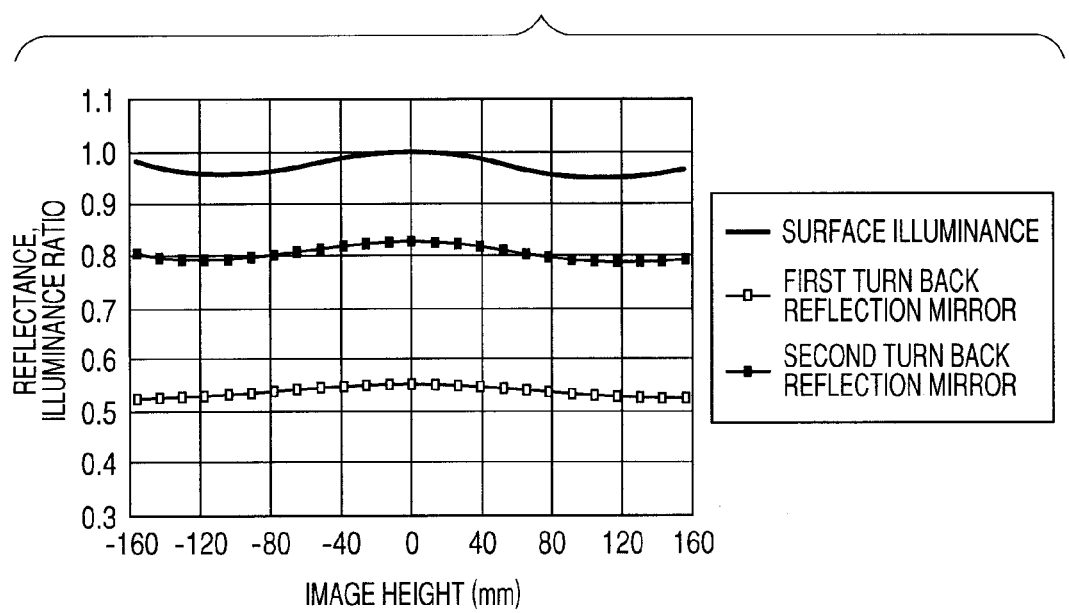
FIGS. 21A and 21B are graphs illustrating image plane illuminance ratios in Embodiment 2 of the present invention in the case where the deviation in polarized direction is taken into account.
Figure 21B:
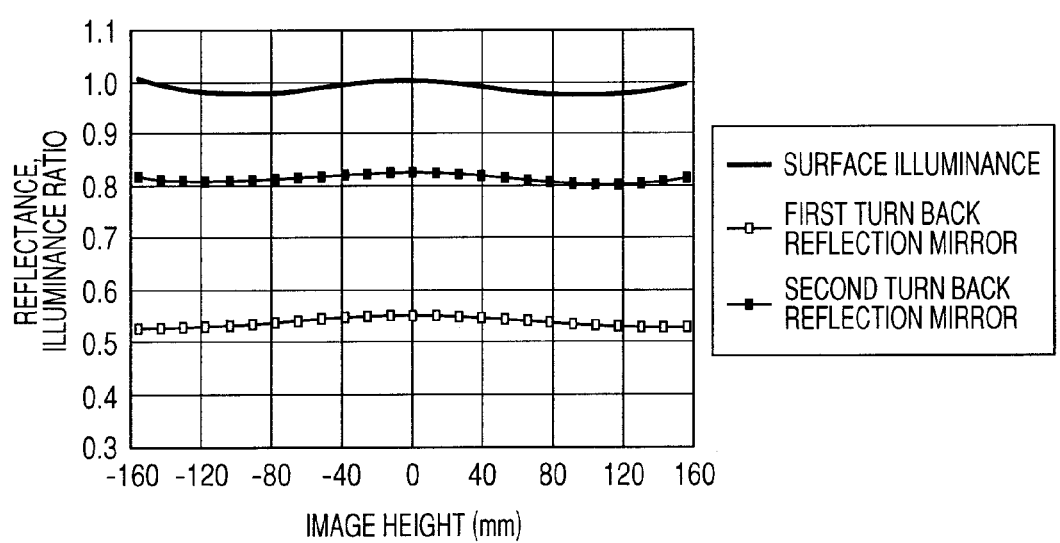

FIGS. 21A and 21B are graphs illustrating the respective P- and S-polarized component ratios obtained as illustrated in FIGS. 20A and 20B and image plane illuminance ratios (image plane illuminance unevenness) on the surface to be scanned in Embodiment 2 of the present invention after the deviation in polarized direction is taken into account, which are obtained from Expression (10). The graph of FIG. 21A illustrates the scanning unit S1 side and the graph of FIG. 21B illustrates the scanning unit S2 side.

As is apparent from the results, when the image plane illuminance at the image height of 0 mm which corresponds to the on-axis light beam is normalized, light amount unevenness in the scanning unit S1 is maximized in the vicinity of an image height of +117 mm and the amount of light is reduced by 5%. Even in the scanning unit S2, the amount of light is reduced by 3% in the vicinity of the image height of +117 mm. Therefore, it is apparent that the image plane illuminance unevenness in this embodiment is suppressed as compared with the comparative example described above.

As described above, according to this embodiment, the mirrors having the minimum reflectance are provided in the positions in which the on-axis incident angle is minimum in the scanning units each including at least two turn back reflection mirrors, and hence the image plane illuminance unevenness due to the deviation in polarized direction which is caused by birefringence may be suppressed.

According to an advantage specific to this embodiment, the reflection film satisfying the two thin film characteristics in the second turn back reflection mirrors 17a and 17b of the respective scanning units S1 and S2 is used common to the second turn back reflection mirrors 17a and 17b, and hence mirror manufacturing is facilitated.

(Color Image Forming Apparatus)

Figure 22:
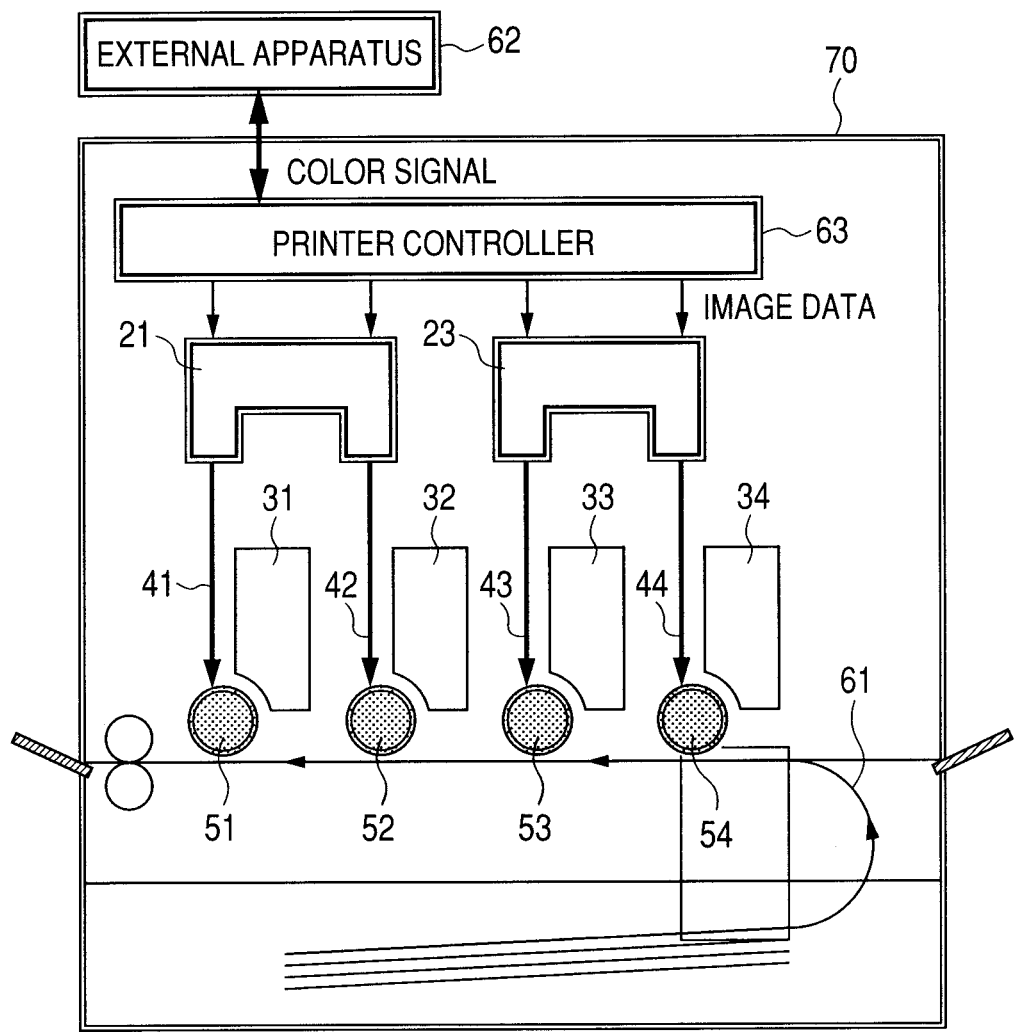
FIG. 22 is a principal sectional view in a sub scanning direction, illustrating an example of a color image forming apparatus to which the present invention may be applied.

FIG. 22 is a schematic diagram illustrating a main portion of a color image forming apparatus using the scanning optical apparatus according to any one of Embodiments 1 and 2 of the present invention. This embodiment describes a tandem type color image forming apparatus in which two scanning optical apparatus are arranged to record image information (electrostatic latent image) in parallel on surfaces of photosensitive drums each serving as an image bearing member. In FIG. 22, a color image forming apparatus 70 includes scanning optical apparatus 21 and 23 each having the configuration described in any one of Embodiments 1 and 2, photosensitive drums 51, 52, 53, and 54 each serving as an image bearing member, developing devices (developing units) 31, 32, 33, and 34, and a transport belt 61. In FIG. 22, the color image forming apparatus 70 also includes a transferring unit (not shown) that transfers a toner image developed by the developing unit onto a material to be transferred, and a fixing device (fixing unit) (not shown) that fixes the transferred toner image to the material to be transferred. In FIG. 22, respective color signals (code data) of red (R), green (G), and blue (B) are input from an external apparatus 62 such as a personal computer to the color image forming apparatus 70. The color signals are converted into pieces of image data of cyan (C), magenta (M), yellow (Y), and black (B) by a printer controller 63 in the color image forming apparatus. The pieces of image data are input to the scanning optical apparatus 21 and 23. Light beams 41, 42, 43, and 44 which are modulated according to the respective pieces of image data are emitted from the scanning optical apparatus 21 and 23. Photosensitive drum surfaces of the photosensitive drums 51, 52, 53, and 54 are scanned with the light beams 41, 42, 43, and 44 in a main scanning direction.

According to the color image forming apparatus to which this embodiment may be applied, the two scanning optical apparatus 21 and 23 are arranged. The two scanning optical apparatus respectively correspond to the respective colors of cyan (C), magenta (M), yellow (Y), and black (B). The image signals (image information) are recorded in parallel on the surfaces of the photosensitive drums 51, 52, 53, and 54, thereby printing a color image at high speed. In this embodiment, color images of yellow (Y), magenta (M), cyan (C), and black (B) correspond to the scanning units S3, S4, S1, and S2 illustrated in FIG. 17 in the stated order.

According to the color image forming apparatus to which this embodiment may be applied, as described above, latent images of the respective colors are formed on the corresponding surfaces of the photosensitive drums 51, 52, 53, and 54 using the light beams based on the respective pieces of image data by each of the two scanning optical apparatus 21 and 23. After that, the multi-transfer is performed on a recording material to produce a full color image. A color image reading apparatus including a CCD sensor or the like may be used as the external apparatus 62. In this case, the color image reading apparatus and the color image forming apparatus 70 constitute a color digital copying machine. In the present invention, the scanning optical apparatus according to any one of Embodiments 1 and 2 is applied to the color image forming apparatus. It is needless to say that the scanning optical apparatus may be applied to a monochrome image forming apparatus.

A recording density of the color image forming apparatus used in the present invention is not particularly limited. However, when the recording density becomes higher, high quality is increasingly required. Therefore, the structures in Embodiments 1 and 2 of the present invention are more effective for an image forming apparatus of 1,200 dpi or more.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese patent application No. 2009-134842, filed Jun. 4, 2009, which is hereby incorporated by reference herein its entirety.

What is claimed is:

1. A scanning optical apparatus comprising:
a light source unit;
a deflecting unit that deflect a light beam emitted from the light source unit;
an incident optical system that guides the light beam emitted from the light source unit to the deflecting unit;
an imaging optical system that forms an image on a surface to be scanned using a light beam deflected by the deflecting unit; and
at least two optical path changing elements positioned along an optical path between the deflecting unit and the surface to be scanned,
wherein one of the at least two optical path changing elements has a minimum reflectance, having a reflectance equal to or smaller than 70% in all areas used for image formation, and
wherein an on-axis light beam enters the one optical path changing element having the minimum reflectance at a minimum incident angle in a sub-scanning section.

2. A scanning optical apparatus according to claim 1, wherein the one optical path changing element having the minimum reflectance has a maximum change in a S-polarized reflectance and a P-polarized reflectance at an arbitrary incident angle corresponding to an image forming area.

3. A scanning optical apparatus according to claim 1, wherein the at least two optical path changing elements have a difference between an S-polarized reflectance and a P-polarized reflectance which is equal to or smaller than 10% at an arbitrary incident angle corresponding to an image forming area.

4. A scanning optical apparatus according to claim 1, wherein the light beam entering the one optical path changing element having the minimum reflectance has an incident angle equal to or smaller than 15° in an image forming area.

5. A scanning optical apparatus according to claim 1, wherein:
the imaging optical system includes an imaging optical element positioned along the optical path from the deflection unit to the surface to be scanned at a position nearer than a position of the one optical path changing element having the minimum reflectance,
wherein the one imaging optical element having the minimum reflectance is shifted in a direction parallel to a rotating-axis of the deflecting unit.

6. A scanning optical apparatus according to claim 1, wherein the light source unit comprises a multi-beam light source including multiple light emitting portions.

7. A scanning optical apparatus according to claim 1, wherein the on-axis light beam enters only the one optical path changing element having the minimum reflectance at the minimum incident angle in the sub scanning section.

8. An color image forming apparatus comprising:
a scanning optical apparatus comprising:
a light source unit;
a deflecting unit that deflect a light beam emitted from the light source unit;
an incident optical system that guides the light beam emitted from the light source unit to the deflecting unit;
an imaging optical system that forms an image on a surface to be scanned using a light beam deflected by the deflecting unit; and
at least two optical path changing elements positioned along an optical path between the deflecting unit and the surface to be scanned,
wherein one of the at least two optical path changing elements has a minimum reflectance, having a reflectance equal to or smaller than 70% in all areas used for image formation, and
wherein an on-axis light beam enters the one optical path changing element having the minimum reflectance at a minimum incident angle in a sub-scanning section; and
a developing unit that develops an electrostatic latent image into a toner image, the electrostatic latent image being formed on an image bearing member arranged on the surface to be scanned by the scanning optical apparatus.

9. An image forming apparatus according to claim 8, further comprising a printer controller that converts a signal input from an external apparatus into image data and inputs the image data to the scanning optical apparatus.

* * * * *